(12) United States Patent
Li et al.

(10) Patent No.: US 12,317,193 B2
(45) Date of Patent: May 27, 2025

(54) INTENT STATE MANAGEMENT METHOD, NETWORK ELEMENT, AND SYSTEM

(71) Applicant: Huawei Technologies Co., Ltd., Shenzhen (CN)

(72) Inventors: Yexing Li, Shanghai (CN); Yijun Yu, Dongguan (CN); Qi Su, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 465 days.

(21) Appl. No.: 17/898,100

(22) Filed: Aug. 29, 2022

(65) Prior Publication Data

US 2022/0417862 A1    Dec. 29, 2022

Related U.S. Application Data

(63) Continuation of application No. PCT/CN2021/076712, filed on Feb. 18, 2021.

(30) Foreign Application Priority Data

Feb. 29, 2020   (CN) .......................... 202010132739.3

(51) Int. Cl.
*H04W 52/02*        (2009.01)
(52) U.S. Cl.
CPC ................................ *H04W 52/0261* (2013.01)
(58) Field of Classification Search
CPC ................................................ H04W 52/0261
USPC ......................................................... 370/331
See application file for complete search history.

(56) References Cited

U.S. PATENT DOCUMENTS

| 10,075,459 B1 | 9/2018 | Suryanarayanan et al. |
| 2012/0224569 A1 | 9/2012 | Kubota |

FOREIGN PATENT DOCUMENTS

| CN | 103631633 A | 3/2014 |
| CN | 105578614 A | 5/2016 |
| CN | 108475506 A | 8/2018 |

OTHER PUBLICATIONS

"Experiential Networked Intelligence (ENI); ENI use cases," ETSI GS ENI 001 V2.1.1, pp. 1-92, Sophia Antipolis, Cedex, France (Sep. 2019).

(Continued)

*Primary Examiner* — Derrick V Rose
(74) *Attorney, Agent, or Firm* — Leydig, Voit & Mayer, Ltd.

(57) ABSTRACT

An intent state management method, network element, and system are described. A first network element obtains a first network parameter value corresponding to an intent; and determines, based on the first network parameter value corresponding to the intent, that a condition for achieving the intent is not satisfied. In accordance with the determination, the first network element suspends execution of the intent, sends a first notification message to a second network element, where the first notification message notifies the intent to enter a sleep state; and sets the sleep state to an active state when the condition for achieving the intent is satisfied or the intent is modified. Network resources of the first network element can be saved. When the condition for achieving the intent is satisfied or the intent is modified, the intent enters the active state, so that a state of the intent can be adjusted in time.

20 Claims, 21 Drawing Sheets

(56) References Cited

OTHER PUBLICATIONS

"Add solution for Intent driven NSI performance assurance scenario," 3GPP TSG-SA5 Meeting #127, Sophia Antipolis, France, S5-196208, Total 2 pages, 3rd Generation Partnership Project, Valbonne, France (Oct. 14-18, 2019).

"3rd Generation Partnership Project; Technical Specification Group Services and System Aspects; Feasibility Study on New Services and Markets Technology Enablers for Massive Internet of Things; Stage 1 (Release 14)," 3GPP TR 22.861 V14.1.0, pp. 1-28, 3rd Generation Partnership Project, Valbonne, France (Sep. 2016).

"Add the solution for intent driven network optimization scenario," 3GPP TSG-SA5 Meeting #125AdHoc, Sapporo, Japan, S5-194141, Total 3 pages, 3rd Generation Partnership Project, Valbonne, France (Jun. 25-28, 2019).

"Experiential Networked Intelligence (ENI); Intent Aware Network Autonomy," ETSI GR ENI 008 V0.0.4, Total 16 pages (Sep. 2019).

"Experiential Networked Intelligence (ENI); Terminology for Main Concepts in ENI," ETSI GR ENI 004 V2.1.1, Total 20 pages (Oct. 2019).

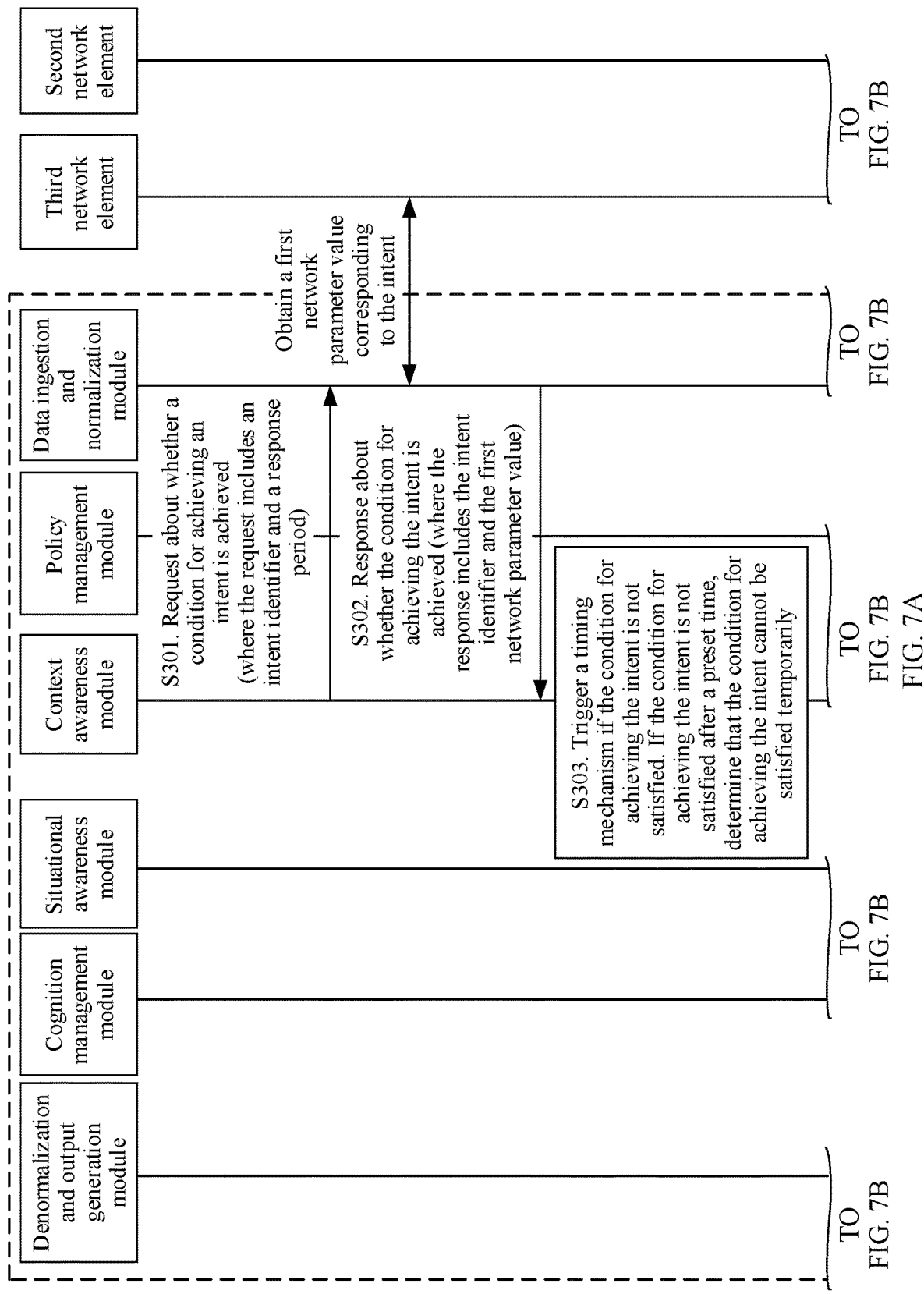

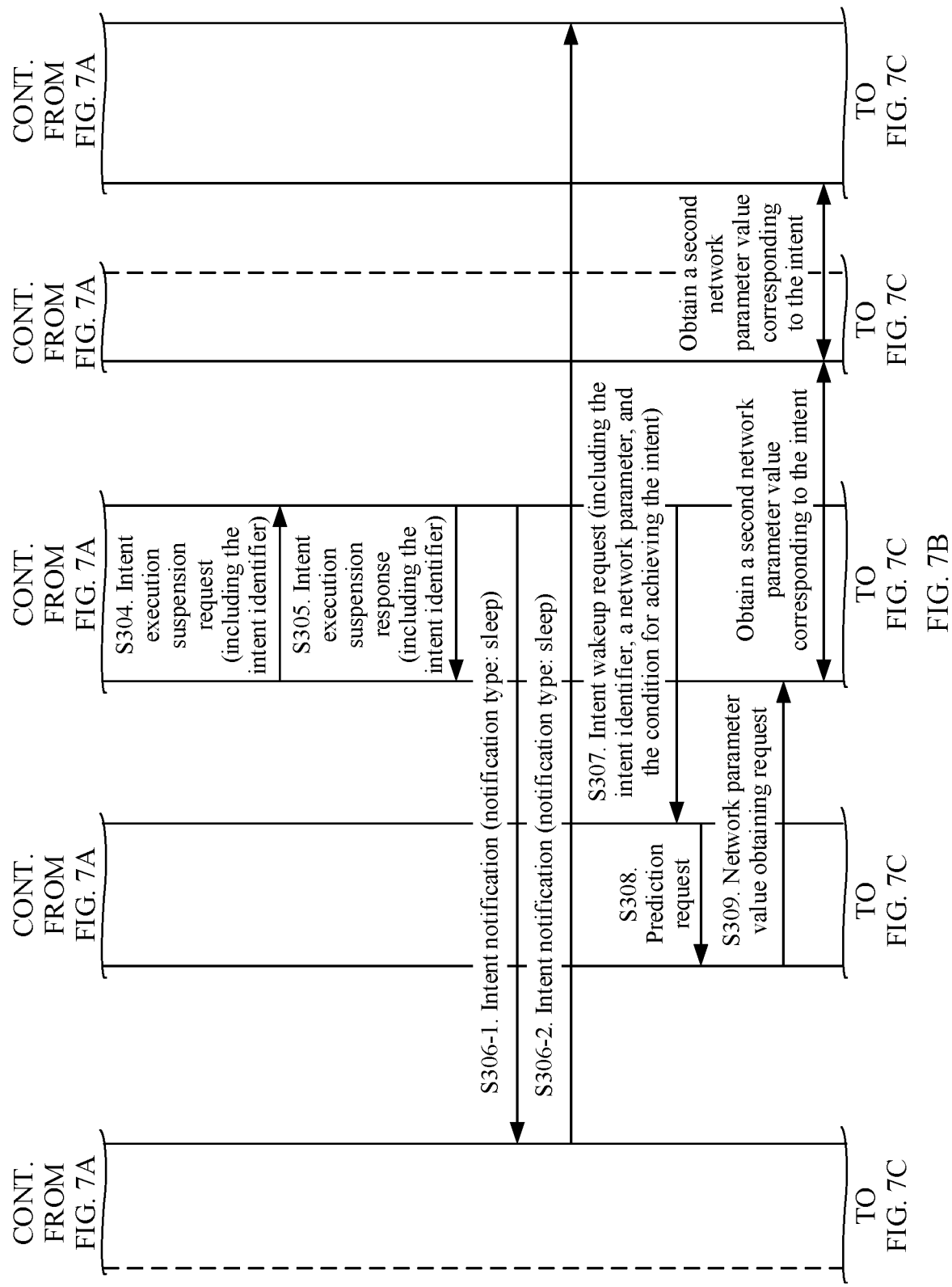

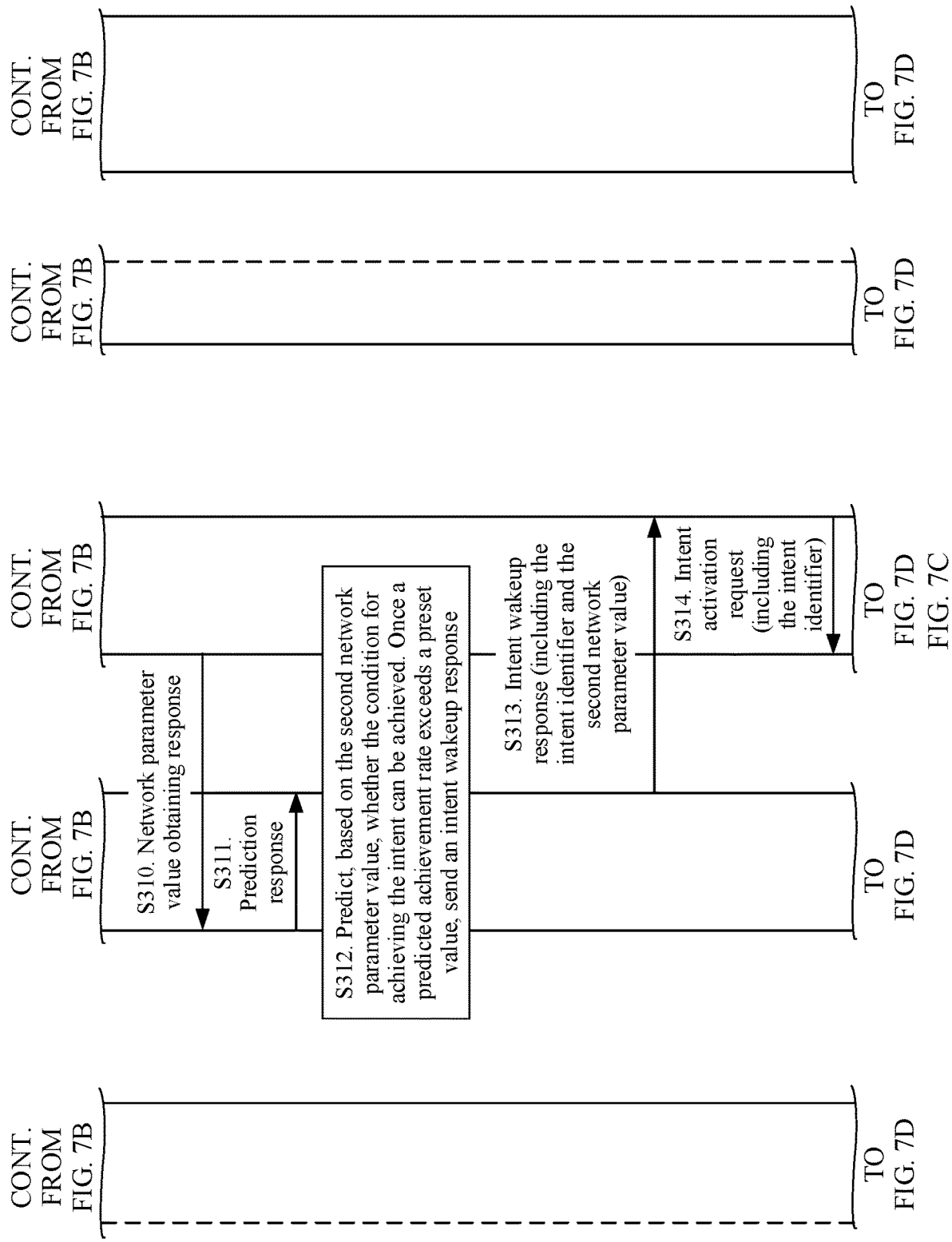

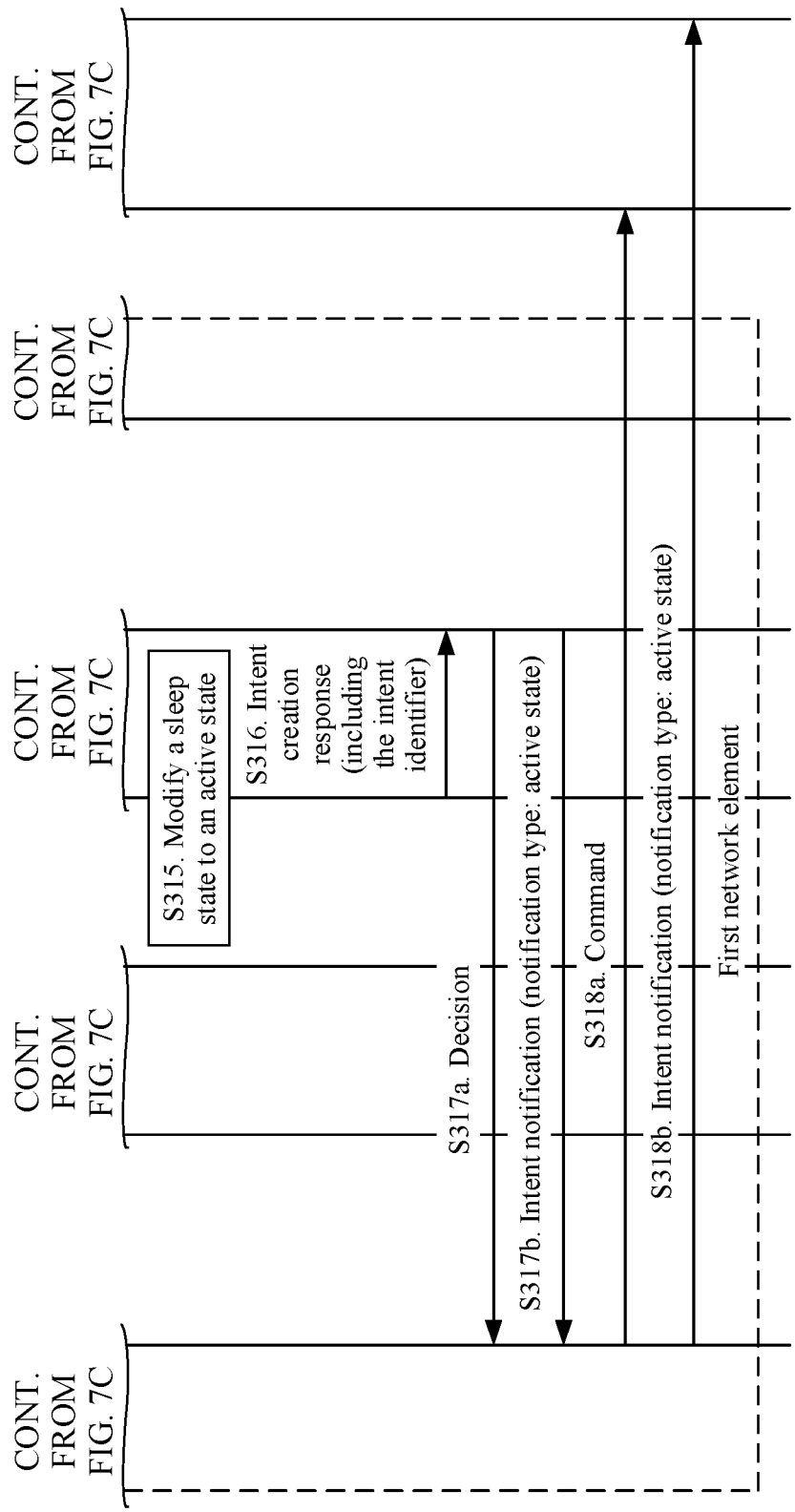

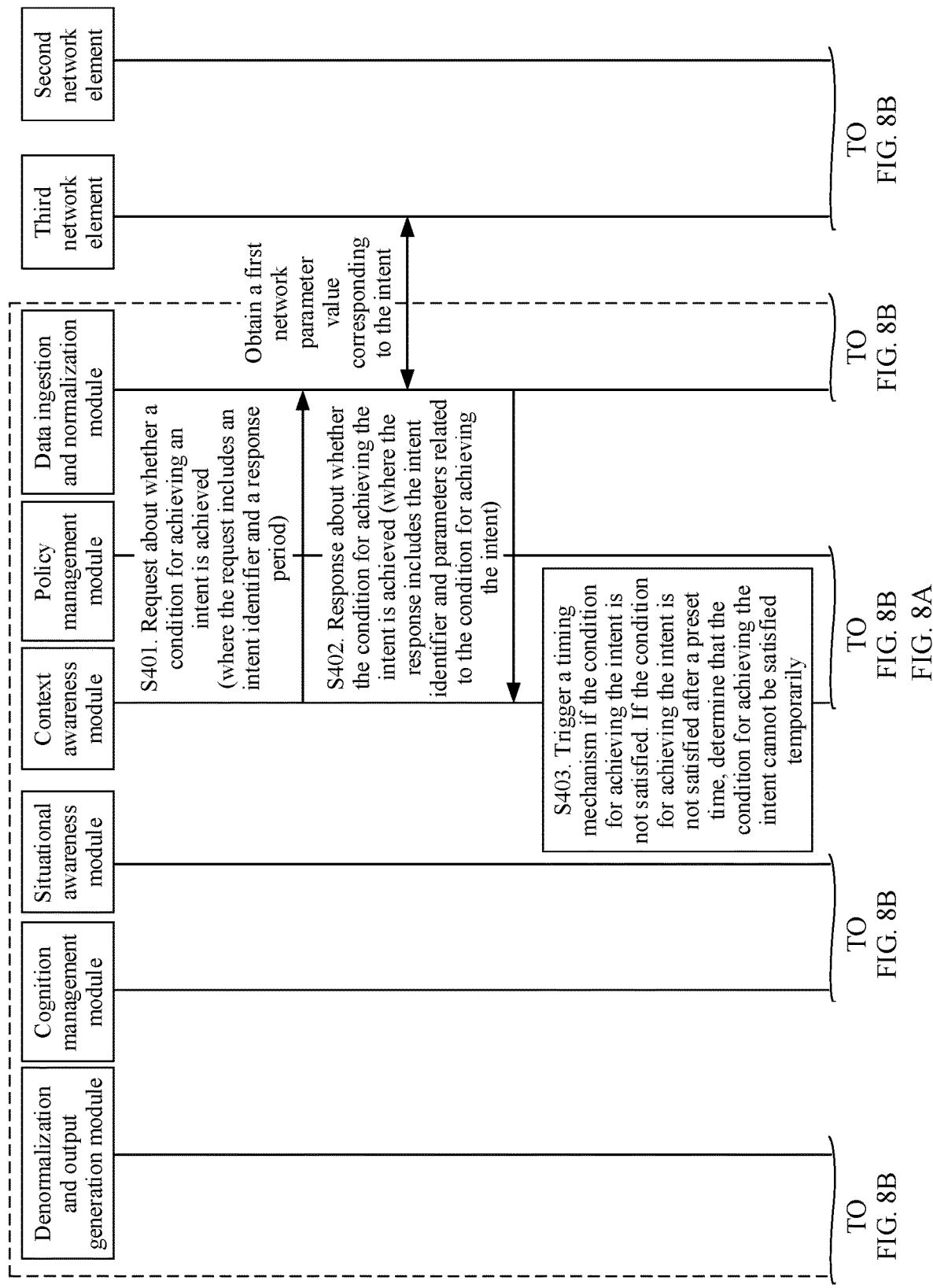

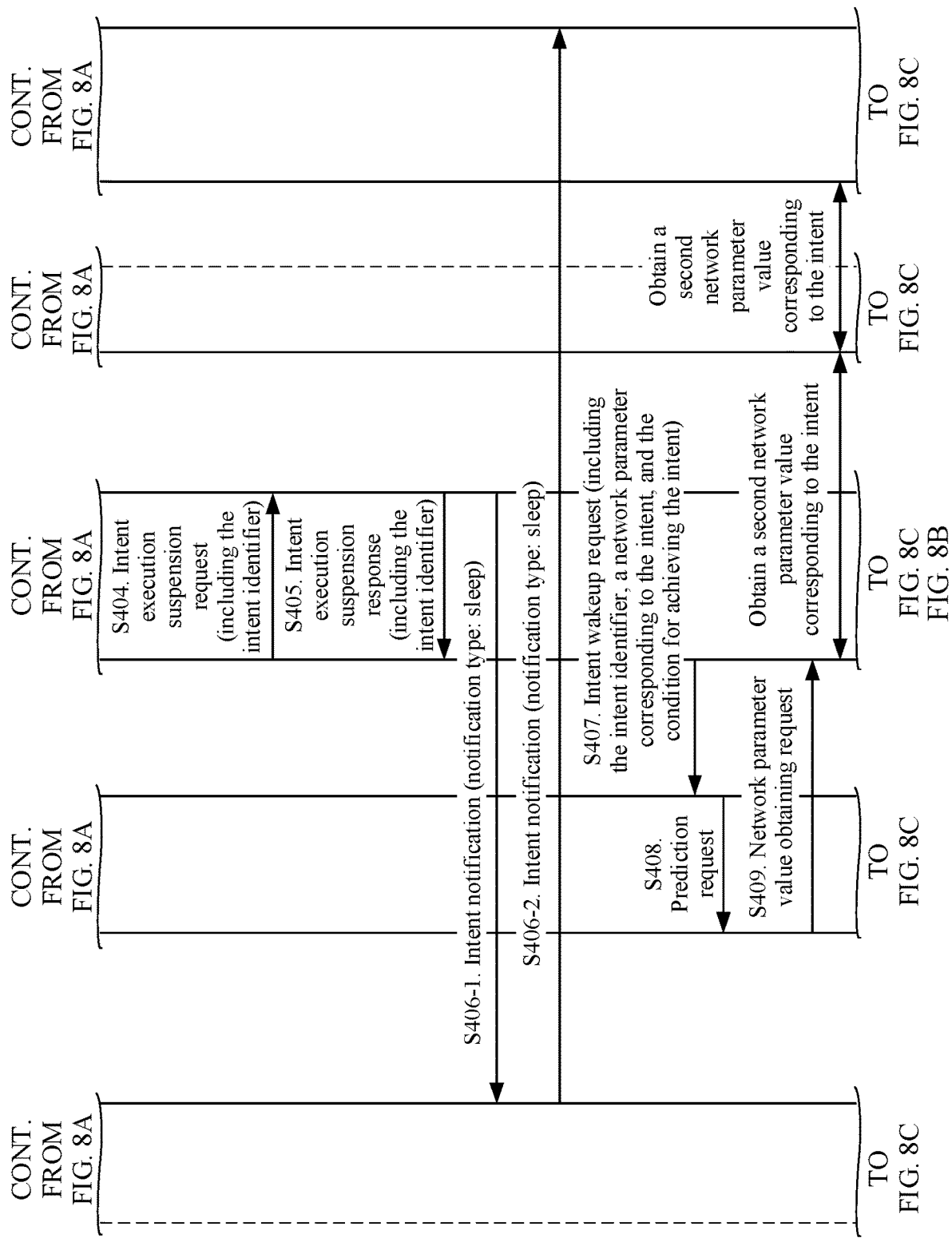

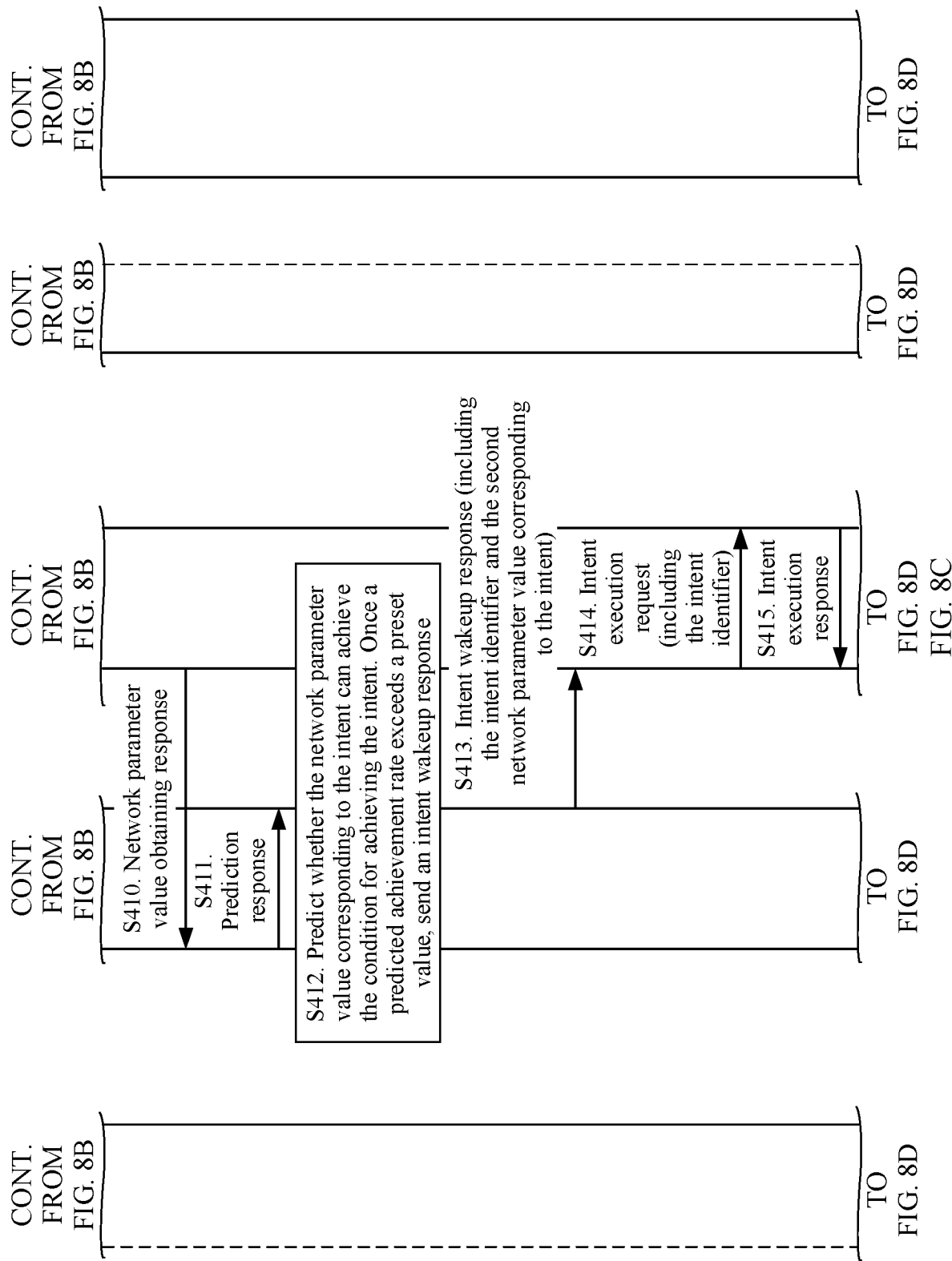

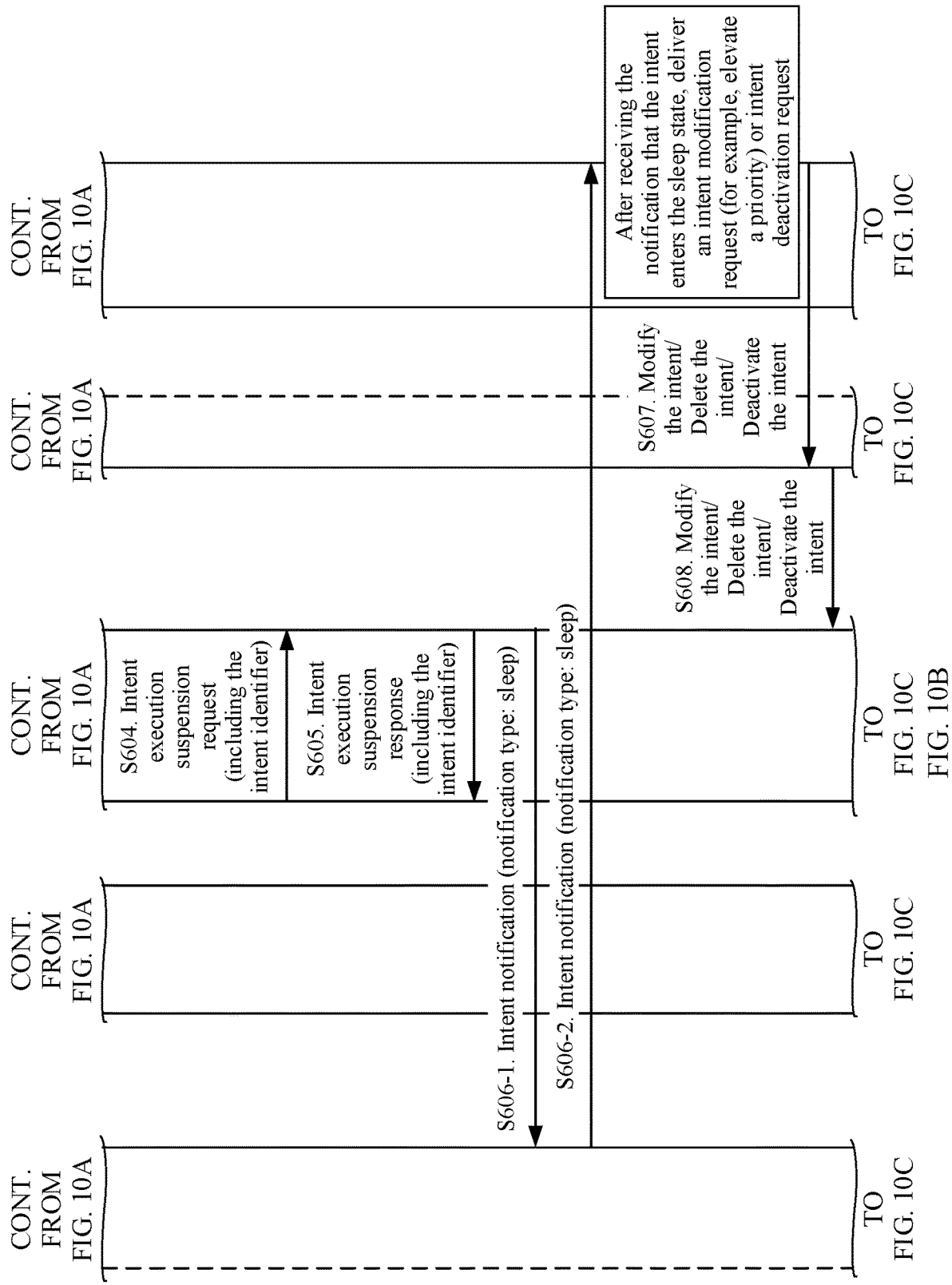

INTENT STATE MANAGEMENT METHOD, NETWORK ELEMENT, AND SYSTEM

CROSS-REFERENCE TO RELATED APPLICATIONS

This application is a continuation of International Patent Application No. PCT/CN2021/076712, filed on Feb. 18, 2021, which claims priority to Chinese Patent Application No. 202010132739.3, filed on Mar. Feb. 29, 2020. The disclosures of the aforementioned applications are hereby incorporated by reference in their entireties.

TECHNICAL FIELD

This application relates to the network management field, and in particular, to an intent state management method, network element, and system.

BACKGROUND

With the emergence of key technologies in the 5th generation (5G) mobile communications field, such as network functions virtualization (NFV) and network slicing, networks become more flexible and powerful, but are still very complex. At present, experiential networked intelligence (ENI) is proposed, which defines a cognitive network management architecture using an observational direction-driven behavior control model. The experiential networked intelligence uses artificial intelligence (AI) techniques and context-aware policies to adjust offered services based on changes in user needs, environmental conditions, and business goals. This can help operators automate their network configuration and monitoring processes, to reduce operating expenses and improve the use and maintenance of their networks.

An intent creation device sends an intent to the ENI. A function module of the ENI orchestrates the intent as an executable instruction, and sends the instruction to an intent applied entity for execution. FIG. 1 is a schematic diagram of mutual conversion between states of an intent. Currently, an intent has two states: an active state and an inactive state. When the intent is in the active state, it indicates that an operation corresponding to the intent is being executed by the ENI. When the intent is in the inactive state, it indicates that the ENI retains context information of the intent, but an operation and a command corresponding to the intent are not executed by the ENI and the intent applied entity. Because the ENI retains the context information of the intent, the intent creation device may send an activation instruction to activate the intent in the inactive state.

However, the intent creation device sends the activation instruction only depending on intent management requirements, but the ENI does not know, after the intent is activated, whether the intent can be executed by the ENI. As a result, the ENI keeps executing the intent, causing a waste of network resources.

SUMMARY

This application provides an intent state management method, network element, and system, to save network resources of a first network element and adjust a state of an intent in time.

According to a first aspect, an intent state management method is provided. The method includes: A first network element obtains a first network parameter value corresponding to an intent. The first network element determines, based on the first network parameter value corresponding to the intent, that a condition for achieving the intent is not satisfied. The first network element suspends, execution of the intent. The first network element sends a first notification message to a second network element, where the first notification message notifies the intention to enter a sleep state. The first network element sets the sleep state to an active state when the condition for achieving the intent is satisfied or the intent is modified.

In this aspect, the network parameter value corresponding to the intent is monitored, and execution of the intent is suspended when the condition for achieving the intent is not satisfied, so that network resources of the first network element can be saved. In addition, when the condition for achieving the intent is satisfied or the intent is modified, the intent enters an active state, so that a state of the intent can be adjusted in time, thereby improving intent execution efficiency.

In a possible implementation, that the first network element obtains a first network parameter value corresponding to an intent includes: The first network element obtains, from a third network element, the first network parameter value corresponding to the intent. The method further includes: The first network element sends an indication message to the third network element, where the indication message indicates the third network element to suspend execution of a command corresponding to the intent.

In this implementation, when the condition for achieving the intent is not satisfied, the intent enters the sleep state, and the third network element may be indicated to suspend execution of the command corresponding to the intent, to save network resources and reduce power consumption of an intent applicable device.

In a possible implementation, that the first network element determines, based on the first network parameter value corresponding to the intent, that a condition for achieving the intent is not satisfied includes: The first network element obtains an initial value of a network parameter corresponding to the intent. If the initial value of the network parameter corresponding to the intent is less than or equal to a first threshold, the first network element starts a timer, where timing duration of the timer is a window length of a waiting time window of an intent to enter the sleep state. If the first network parameter value corresponding to the intent is still less than or equal to the first threshold when the timing duration expires, the first network element determines that the condition for achieving the intent is still not satisfied.

In this implementation, whether the condition for achieving the intent can be satisfied is determined within specific timing duration, to improve accuracy of determining and stability of intent execution.

In a possible implementation, the method further includes: The first network element receives a sleep time configuration request from the second network element, where the sleep time configuration request includes information about waiting time windows of all intents that are created by the second network element to enter the sleep state, and the information about the waiting time windows of all the intents to enter the sleep state includes window lengths. The first network element sends a sleep time configuration response to the second network element.

In this implementation, the second network element may set a same window length of the waiting time windows of intents to enter the sleep state for all the intents, where the window length is the timing duration of the timer. This improves efficiency of setting the waiting time windows of the intents to enter the sleep state.

In a possible implementation, the method further includes: The first network element receives an intent creation request from the second network element, where the intent creation request includes information about a waiting time window of the intent that is created by the second network element to enter the sleep state, and the information about the waiting time window of the intent to enter the sleep state includes the window length. The first network element sends an intent creation response to the second network element.

In this implementation, a window length of a waiting time window of a specific intent to enter the sleep state may be set for the intent. This improves flexibility of setting the waiting time window of the intent to enter the sleep state.

In a possible implementation, after the first network element sends the first notification message to the second network element, the method further includes: The first network element sets the state of the intent to the sleep state.

In a possible implementation, that the first network element sets the sleep state to an active state when the intent is modified includes: The first network element receives an intent modification request from the second network element, where the intent modification request requests to modify one or more parameters of the intent: the condition for achieving the intent, an intent command impact area, an intent priority, and an execution sequence of the intent. The first network element modifies the one or more parameters of the intent based on the intent modification request. The first network element sets the sleep state to the active state.

In this implementation, the first network element may modify the one or more parameters of the intent to activate the intent, to set the intent from the sleep state to the active state. In this way, the intent that enters the sleep state can be activated in time, the state of the intent is adjusted in time, and intent execution efficiency is improved. Modifying the parameters of the intent can increase a network resource usage and the like of the intent.

In a possible implementation, the method further includes: The first network element receives an intent deactivation request from the second network element, where the deactivation request requests to deactivate the intent and retain context information of the intent. The first network element deactivates the intent based on the intent deactivation request; or the first network element receives an intent deletion request from the second network element, where the intent deletion request requests to delete the context information of the intent. The first network element deletes the context information of the intent based on the intent deletion request.

In this implementation, the intent in the sleep state may be further deactivated or deleted, to implement conversion between states of the intent.

In a possible implementation, that the first network element sets the sleep state to an active state when the condition for achieving the intent is satisfied includes: The first network element obtains a second network parameter value corresponding to the intent. The first network element predicts, based on the second network parameter value, that the condition for achieving the intent can be satisfied in a first time period. The first network element sets the sleep state to the active state. The method further includes: The first network element sends a second notification message to the second network element, where the second notification message notifies the intent to enter the active state.

In this implementation, the network parameter corresponding to the intent may continue to be monitored, and when it is predicted, based on the obtained second network parameter value corresponding to the intent, that the condition for achieving the intent can be satisfied in a future time period, the intent may be activated, and the state of the intent may be adjusted in time, thereby improving intent execution efficiency.

According to a second aspect, an intent state management method is provided. The method includes: A second network element sends an intent execution request to a first network element, where the intent execution request includes a network parameter corresponding to an intent and a condition for achieving the intent. When determining, based on a first network parameter value corresponding to the intent, that the condition for achieving the intent is not satisfied, the second network element receives a first notification message from the first network element, where the first notification message notifies the intent to enter a sleep state.

In a possible implementation, the method further includes: The second network element sends a sleep time configuration request to the first network element, where the sleep time configuration request includes information about waiting time windows of all intents that are created by the second network element to enter the sleep state, and the information about the waiting time windows of all the intents to enter the sleep state includes window lengths. The second network element receives a sleep time configuration response from the first network element.

In a possible implementation, the method further includes: The second network element sends an intent creation request to the first network element, where the intent creation request includes information about a waiting time window of the intent that is created by the second network element to enter the sleep state, and the information about the waiting time window of the intent to enter the sleep state includes the window length. The second network element receives an intent creation response from the first network element.

In a possible implementation, the method further includes: The second network element sends an intent modification request to the first network element, where the intent modification request requests to modify one or more of the following parameters of the intent: the condition for achieving the intent, an intent command impact area, an intent priority, and an execution sequence of the intent, and the modified intent is going to enter an active state.

In a possible implementation, the method further includes: The second network element sends an intent deactivation request to the first network element, where the deactivation request requests to deactivate the intent and retain context information of the intent, and a state of the intent is a deactive state; or the second network element sends an intent deletion request to the first network element, where the intent deletion request requests to delete context information of the intent, and the context information of the intent is to be deleted.

According to a third aspect, an intent state management network element is provided. The network element includes: a first obtaining unit, configured to obtain a first network parameter value corresponding to an intent; a first determining unit, configured to determine, based on the first network parameter value corresponding to the intent, that a condition for achieving the intent is not satisfied; an execution unit, configured to suspend execution of the intent; a sending unit, configured to send a first notification message, where the first notification message notifies the intent to enter a sleep state; and a setting unit, configured to set the sleep state to an active state when the condition for achieving the intent is satisfied or the intent is modified.

In a possible implementation, the first obtaining unit is configured to obtain, from a third network element, the first network parameter value corresponding to the intent. The sending unit is further configured to send an indication message to the third network element, where the indication message indicates the third network element to suspend execution of a command corresponding to the intent.

In a possible implementation, the first determining unit includes: a second obtaining unit, configured to obtain an initial value of a network parameter corresponding to the intent; a timing unit, configured to start a timer if the initial value of the network parameter corresponding to the intent is less than or equal to a first threshold, where timing duration of the timer is a window length of a waiting time window of an intent to enter the sleep state; and a second determining unit, configured to: if the first network parameter value corresponding to the intent is still less than or equal to the first threshold when the timing duration expires, determine that the condition for achieving the intent is still not satisfied.

In a possible implementation, the network element further includes: a receiving unit, configured to receive a sleep time configuration request from the second network element, where the sleep time configuration request includes information about waiting time windows of all intents that are created by the second network element to enter the sleep state, and the information about the waiting time windows of all the intents to enter the sleep state includes window lengths. The sending unit is further configured to send a sleep time configuration response to the second network element.

In a possible implementation, the receiving unit is configured to receive an intent creation request from the second network element, where the intent creation request includes information about a waiting time window of the intent that is created by the second network element to enter the sleep state, and the information about the waiting time window of the intent to enter the sleep state includes the window length. The sending unit is further configured to send an intent creation response to the second network element.

In a possible implementation, the setting unit is further configured to set a state of the intent to the sleep state.

In a possible implementation, the receiving unit is configured to receive an intent modification request from the second network element, where the intent modification request requests to modify one or more parameters of the intent: the condition for achieving the intent, an intent command impact area, an intent priority, and an execution sequence of the intent. The network element further includes: a modification unit, configured to modify the one or more parameters of the intent based on the intent modification request. The setting unit is configured to set the sleep state to the active state.

In a possible implementation, the receiving unit is further configured to receive an intent deactivation request from the second network element, where the deactivation request requests to deactivate the intent and retain context information of the intent. The network element further includes: a deactivation unit, configured to deactivate the intent based on the intent deactivation request. Alternatively, the receiving unit is further configured to receive an intent deletion request from the second network element, where the intent deletion request requests to delete the context information of the intent; and a deleting unit is configured to delete the context information of the intent based on the intent deletion request.

In a possible implementation, the first obtaining unit is further configured to obtain a second network parameter value corresponding to the intent. The network element further includes: a prediction unit, configured to predict, based on the second network parameter value, that the condition for achieving the intent can be satisfied in a first time period. The setting unit is configured to set the sleep state to the active state. The sending unit is configured to send a second notification message to the second network element, where the second notification message notifies the intent to enter the active state.

According to a fourth aspect, an intent state management network element is provided. The network element includes: a sending unit, configured to send an intent execution request to a first network element, where the intent execution request includes a network parameter corresponding to an intent and a condition for achieving the intent; and a receiving unit, configured to: when determining, based on a first network parameter value corresponding to the intent, that the condition for achieving the intent is not satisfied, receive a first notification message from the first network element, where the first notification message notifies the intent to enter a sleep state.

In a possible implementation, the sending unit is further configured to send a sleep time configuration request to the first network element, where the sleep time configuration request includes information about waiting time windows of all intents that are created by the second network element to enter the sleep state, and the information about the waiting time windows of all the intents to enter the sleep state includes window lengths. The receiving unit is further configured to receive a sleep time configuration response from the first network element.

In a possible implementation, the sending unit is further configured to send an intent creation request to the first network element, where the intent creation request includes information about a waiting time window of the intent that is created by the second network element to enter the sleep state, and the information about the waiting time window of the intent to enter the sleep state includes the window length. The receiving unit is further configured to receive an intent creation response from the first network element.

In a possible implementation, the sending unit is further configured to send an intent modification request to the first network element, where the intent modification request requests to modify one or more of the following parameters of the intent: the condition for achieving the intent, an intent command impact area, an intent priority, and an execution sequence of the intent, and the modified intent is going to enter the active state.

In a possible implementation, the sending unit is further configured to send an intent deactivation request to the first network element, where the deactivation request requests to deactivate the intent and retain context information of the intent, and a state of the intent is a deactive state; or the sending unit is further configured to send an intent deletion request to the first network element, where the intent deletion request requests to delete context information of the intent, and the context information of the intent is to be deleted.

According to a fifth aspect, an intent state management system is provided, including the intent state management network element according to any one of the third aspect or the implementations of the third aspect, the intent state management network element according to any one of the fourth aspect or the implementations of the fourth aspect, and a third network element.

According to a sixth aspect, an intent state management network element is provided, including a memory and a processor. The memory stores program instructions, and the processor is configured to invoke the program instructions stored in the memory to perform the method according to any one of the first aspect or the implementations of the first aspect.

According to a seventh aspect, an intent state management network element is provided, including a memory and a processor. The memory stores program instructions, and the processor is configured to invoke the program instructions stored in the memory to perform the method according to any one of the second aspect or the implementations of the second aspect.

According to an eighth aspect, a computer-readable storage medium is provided. The computer-readable storage medium stores instructions, and when the instructions are executed on the computer, the computer is enabled to perform the method according to any one of the foregoing aspects.

According to a ninth aspect, a computer program product including instructions is provided. When the computer program product runs on a computer, the computer is enabled to perform the method according to any one of the foregoing aspects.

BRIEF DESCRIPTION OF DRAWINGS

FIG. 7A to FIG. 7D are a schematic flowchart of an intent state management method based on the architecture of the intent state management system shown in FIG. 3;

FIG. 8A to FIG. 8D are another schematic flowchart of an intent state management method based on the architecture of the intent state management system shown in FIG. 3;

FIG. 10A to FIG. 10C are still another schematic flowchart of an intent state management method based on the architecture of the intent state management system shown in FIG. 3;

DESCRIPTION OF EMBODIMENTS

The following describes embodiments of this application with reference to the accompanying drawings in embodiments of this application.

Figure 1:
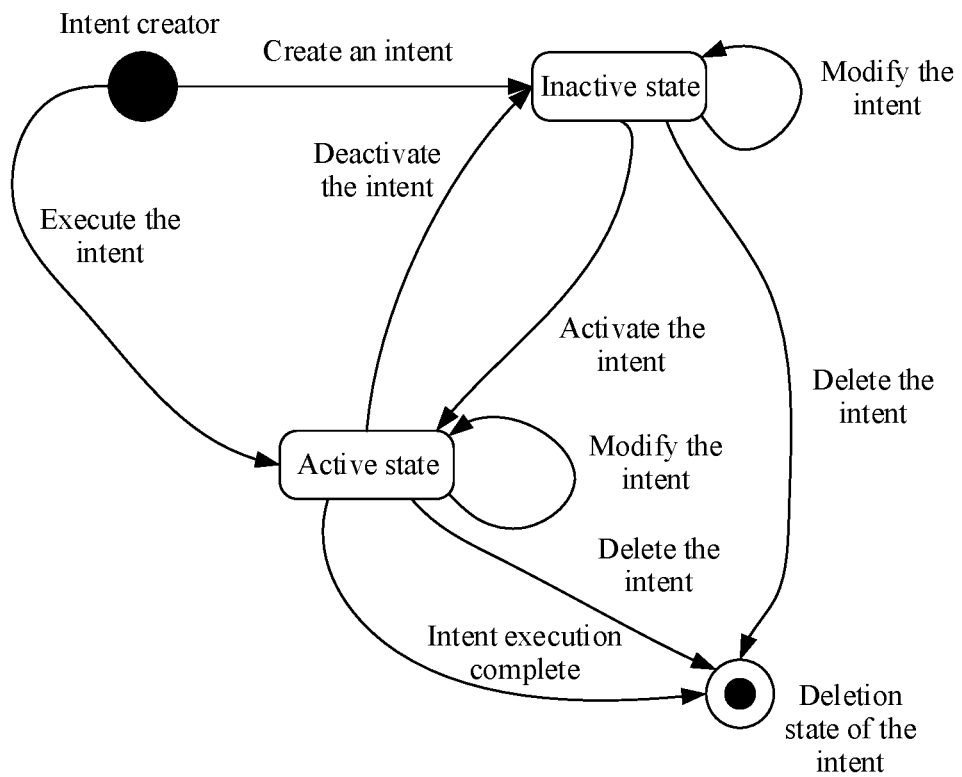
FIG. 1 is a schematic diagram of mutual conversion between states of an intent.
Figure 2:
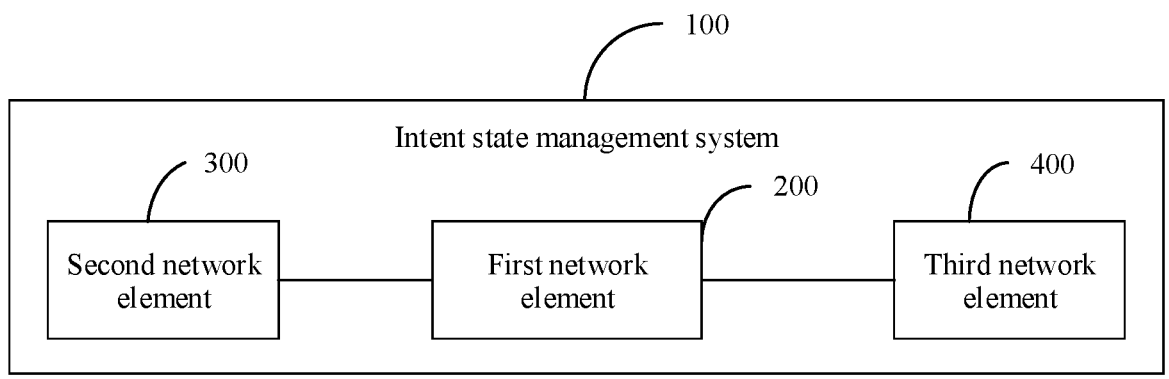
FIG. 2 is a schematic diagram of an architecture of an intent state management system to which an embodiment of this application is applicable.

FIG. 2 is a schematic diagram of an architecture of an intent state management system to which an embodiment of this application is applicable. The intent state management system 100 includes a first network element 200, a second network element 300, and a third network element 400. The second network element 300 transmits a created intent to the first network element 200 for execution. The first network element 200 receives the intent from the second network element 300, translates the intent, performs operations such as orchestrating the intent into a command executable by the third network element 400, and transmits the command to the third network element 400 for execution. The third network element 400 receives the executable command from the first network element 200, and executes the command. The second network element may be a creator of the intent. The third network element may be an intent applied entity (infrastructure), for example, applications, a user, and operations support system- and business support system-like functionality (oss- and bss-like functionality).

Figure 3:
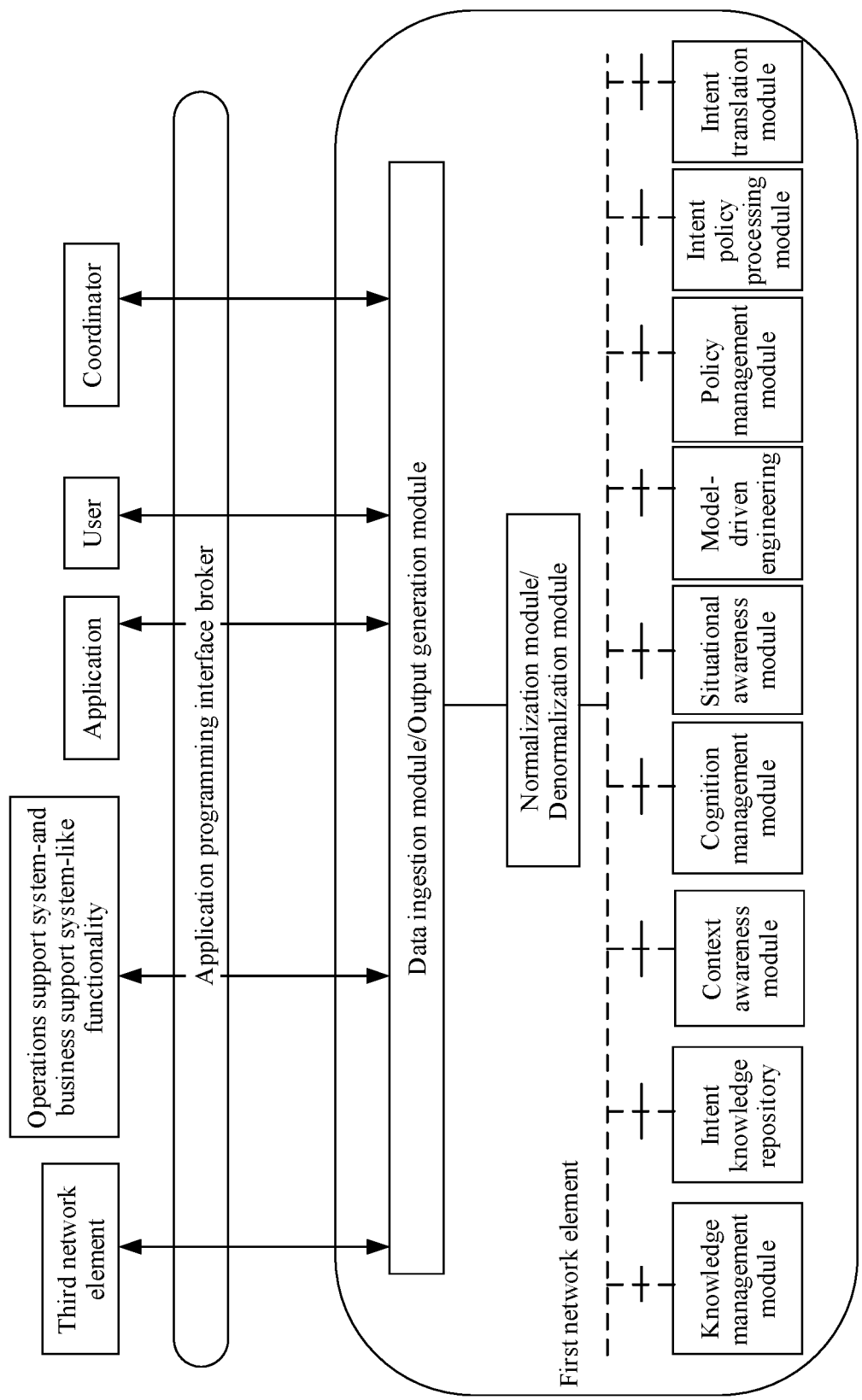
FIG. 3 is a schematic diagram of an internal structure of a first network element.

FIG. 3 is a schematic diagram of an internal structure of a first network element. The first network element is connected to a second network element, a third network element, and an orchestrator through an application programming interface broker (API broker). The API broker is configured to perform format conversion on external data/instructions, to convert the external data/instructions into a format that can be identified by the first network element. The first network element includes an input function module, an output function module, an analysis function module, and a decision-making function module. Internal structures and functions of the function modules are as follows:

1. Input Function Module
(1) Data Ingestion Module:
  Receive decision-making instructions and transparently transmit the decision-making instructions regardless of whether the decision-making instructions are intent policies.
  Receive network status data.
  Receive a network status request from a normalization module, and send the network status data to the normalization module.
(2) Normalization Module:
  Format network status data and convert the network status data into a data format that can be identified by the internal function modules of a converged architecture.
  Receive a network status request from a context awareness module, where the request carries a device identifier (e.g., a device IP) and a parameter name related to a network status, and send the network status data to the context awareness module.
  Receive network status collection tasks sent by the context awareness module, and separately report task-based network statuses to the context awareness module.
  Send the network status request to the data ingestion module.

2. Output Function Module
(1) Output Generation Module

Receive commands sent by a denormalization module.
Send the received commands to a third network element.
(2) Denormalization Module
Receive decisions sent by a policy management module.
Convert the received decisions into a command that can be identified by the third network element.
3. Analysis Function Module
(1) Knowledge Management Module
Provide an intent knowledge repository. Return expert experience and intermediate data based on a query requirement of an intent.
Provide a network information library. Return, based on the query requirement of the intent, network information affected by the intent, for example, cell information and a corresponding network element number.
(2) Context Awareness Module
Maintain states of intents in a current ENI system.
Receive an intent state modification request sent by the policy management module and reply with the request.
(3) Cognition Management Module
Receive a network status request sent by a situational awareness module and return real-time and predicted network statuses.
(4) Situational Awareness Module
Send a network status request to the cognition management module and determine, based on received network status information and a parameter value for achieving an intent, whether an intent target is achieved.
Send an achievement status of the intent target and a network status to a policy management/model-driven engineering module.
4. Decision-Making Function Module
(1) Intent Translation Module
Obtain intent knowledge information and network knowledge information from the intent knowledge repository.
Generate translation results, including an intent execution command and a corresponding network condition, a criterion for achieving an intent, a name and an identifier of an intent applied entity, and a format of a command that can be executed by the device.
Number the intent to generate an intent identifier.
Determine whether a received decision is an intent policy.
Check the syntax and semantics of the intent policy.
Save an intent execution policy and intent maintenance policy based on an intent translation result.
(2) Policy Management Module
Obtain a network status to match an intent execution condition (network status) and obtain a command that needs to be executed. Send network status obtaining information to the context awareness module, where the network status obtaining information includes a related parameter representing the network status and the identifier (e.g., an IP) of the intent applied entity.
Send, to the denormalization module, commands and the identifier (e.g., IPs) of the device that needs to execute the commands.
Send a status change request to the context awareness module to change an intent state from an inactive/active state to an active/inactive state.
Send an intention action update request to the model-driven engineering module, so that the model-driven engineering module generates a new policy depending on an achievement status of an intent, and a policy processing module adjusts a decision (performs intent maintenance) based on the network status and a returned policy.

Perform intent conflict detection. Periodically check whether intents in a system conflict with each other, identify intents that need to be labeled as conflicted/active, and report intent states.
(3) Model-Driven Engineering Module
Receive the achievement status of the intent target from the situational awareness module, and if it is determined that the target is not achieved, generate a corresponding policy and send the corresponding policy to the policy management module.

Figure 4:
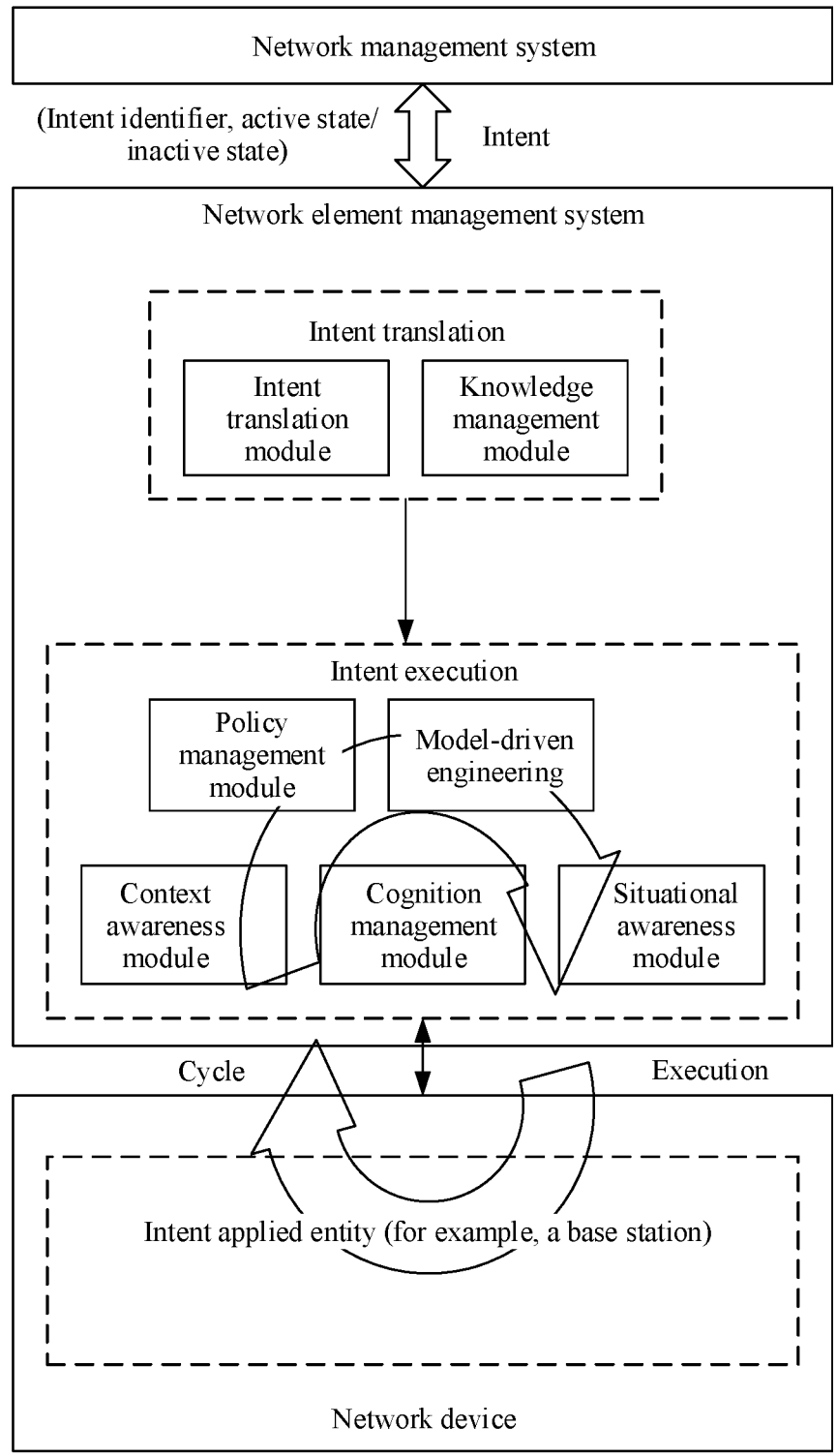
FIG. 4 is a schematic diagram of integrating ENI into wireless network management.

FIG. 4 is a schematic diagram of integrating ENI into wireless network management in a specific example. In the field of network equipment management, a function module of the ENI may be embedded in a network element management system (EMS) (that is, the first network element). A network management system (NMS) (that is, the second network element) sends an intent to the EMS. The EMS translates and executes the intent, and sends a finally generated command to network equipment (NE) (that is, the third network element). After the NE executes the command, the intent is finally achieved.

However, when a network status of the NE is unavailable, the intent is not satisfied for a long time, but the intent is always in an active state. In this case, the EMS keeps executing an operation corresponding to the intent, and the NE keeps executing a command corresponding to the intent, causing a waste of network resources. In addition, the second network element does not know the network status, and cannot properly adjust a state of the intent.

Based on this, embodiments of this application provide a solution for intent state management. A network parameter value corresponding to an intent is monitored, and execution of the intent is suspended when a condition for achieving the intent is not satisfied, so that network resources of a first network element can be saved. In addition, when the condition for achieving the intent is satisfied or the intent is modified, the intent enters an active state, so that a state of the intent can be adjusted in time, thereby improving intent execution efficiency.

It should be noted that in all the embodiments of this application, the first network element may be the network element management system in FIG. 4, the second network element may be the network management system in FIG. 4, and the third network element may be the network equipment in FIG. 4.

Figure 5:
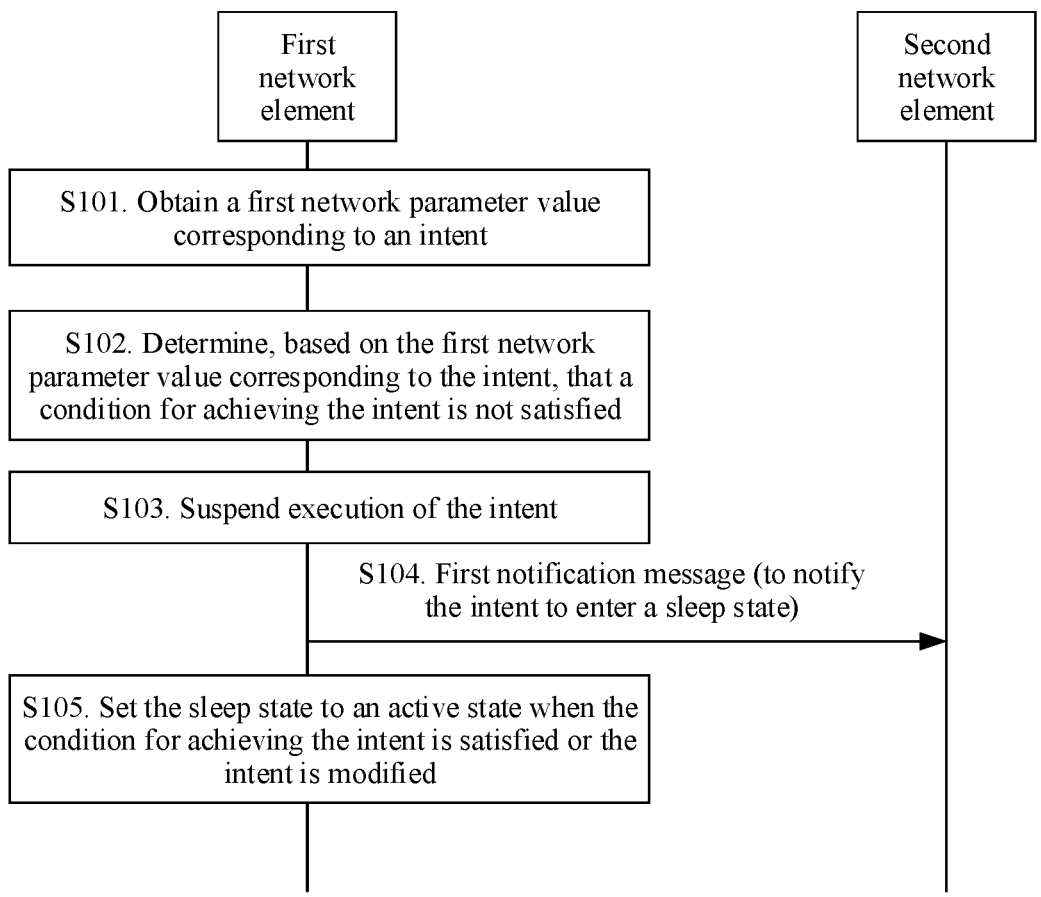
FIG. 5 is a schematic flowchart of an intent state management method according to an embodiment of this application.

FIG. 5 is a schematic flowchart of an intent state management method according to an embodiment of this application. The method may include the following steps:

S101. A first network element obtains a first network parameter value corresponding to an intent.

With the development of technologies such as machine learning and big data analysis, intent-based network management is applied in wireless networks to reduce human-machine interaction and improve network performance. Compared with existing human-based network management, in intent-based network management, simpler instructions are used to tell a network "what to do" instead of "how to do", to reduce inaccuracy in large-scale manual decision-making. Telling the network "what to do" refers to an intent to be achieved, for example, "enhance video service experience of users in area x". To facilitate intent management, the intent may be labeled. Each intent has a unique intent identifier. A condition for achieving the intent is a specific effect to be achieved by the intent, and may also be referred to as an intent target.

Before executing the intent, the first network element obtains, from a second network element or locally, a network parameter corresponding to the intent and a condition for achieving the intent (or referred to as an intent target). The network parameter corresponding to the intent includes an object identifier corresponding to the intent and a specific network parameter. One or more specific network parameters may be included. The network parameter may be any network-related parameter, for example, a throughput or a packet loss rate. It should be noted that the specific network parameter is a network parameter corresponding to the intent, and is a network parameter that needs to be obtained when the intent is executed. For example, if the condition for achieving the intent is that throughputs of N base stations in a geographic area increase by 20%, object identifiers corresponding to the intent are the N base stations in the geographic area, and network parameters corresponding to the intent are the throughputs of the N base stations in the geographic area.

When executing the intent, the first network element needs to obtain the first network parameter value corresponding to the intent. The first network parameter value is a network parameter value corresponding to the current intent.

S102. The first network element determines, based on the first network parameter value corresponding to the intent, that the condition for achieving the intent is not satisfied.

The condition for achieving the intent is closely related to the network parameter corresponding to the intent. If network parameters of only some objects reach a required network parameter threshold (e.g., the increase of 20% in the foregoing example), or none of network parameters of all objects related to the intent reach a required network parameter threshold, it may be considered that the condition for achieving the intent is not satisfied.

In the foregoing example, if the throughputs of the N base stations in the geographic area increase by 15%, or throughputs of M base stations increase by 20%, where M<N, it is considered that the condition for achieving the intent is not satisfied.

An actual network parameter value is a network parameter value actually used when a third network element executes a command corresponding to the intent. The first network element may obtain, from the third network element, the first network parameter value corresponding to the intent.

S103. The first network element suspends execution of the intent.

When the first network element determines that the condition for achieving the intent is not satisfied, if the first network element keeps executing the intent, a waste of network resources is caused. Therefore, the first network element suspends execution of the intent.

In addition to suspending execution of the intent, the first network element may alternatively set the intent to a sleep state. In the sleep state, context information of the intent is retained, and the intent can be activated when the network parameter value corresponding to the intent satisfies the condition for achieving the intent or the intent is modified.

S104. The first network element sends a first notification message to a second network element, where the first notification message notifies the intent to enter the sleep state.

Accordingly, the second network element receives the first notification message. When the first network element suspends execution of the intent, it is necessary to notify the second network element in time, so that the second network element obtains a state of the intent in time.

S105. When the condition for achieving the intent is satisfied or the intent is modified, the first network element sets the sleep state to an active state.

Because the condition for achieving the intent is not satisfied, execution of the intention is suspended and the intent enters the sleep state. However, the actual network parameter value always changes when the third network element executes the command corresponding to the intent, and the first network element monitors the network parameter value corresponding to the intent. When the network parameter value corresponding to the intent enables the condition for achieving the intent to be satisfied in a future time period, the first network element may automatically activate the intent, that is, set the sleep state to the active state, so that the intent can be executed in time.

As described above, the first network element has notified the second network element that the intent enters the sleep state, and execution of the intent is suspended. The second network element may request to modify the intent, for example, modify the intent, to increase a network resource rate occupied by the intent. In this case, the first network element may modify the intent, and the intent enters the active state after being modified, so that the intent can be re-executed.

It can be learned that when the intent is in an inactive state, the second network element may alternatively activate the intent. However, the second network element only sends an activation instruction to activate the intent, without any modification or change to the intent. If it is determined, based on the first network parameter value corresponding to the intent, that the condition for achieving the intent is not satisfied, the intent enters the sleep state, and the second network element activates the intent, the first network element keeps executing the intent, but the intent cannot be successfully executed, causing a waste of network resources.

According to the intent state management method provided in this embodiment of this application, the network parameter value corresponding to the intent is monitored, and execution of the intent is suspended when the condition for achieving the intent is not satisfied, so that network resources of the first network element can be saved. In addition, when the condition for achieving the intent is satisfied or the intent is modified, the intent enters the active state, so that the state of the intent can be adjusted in time, thereby improving intent execution efficiency.

Figure 6A:
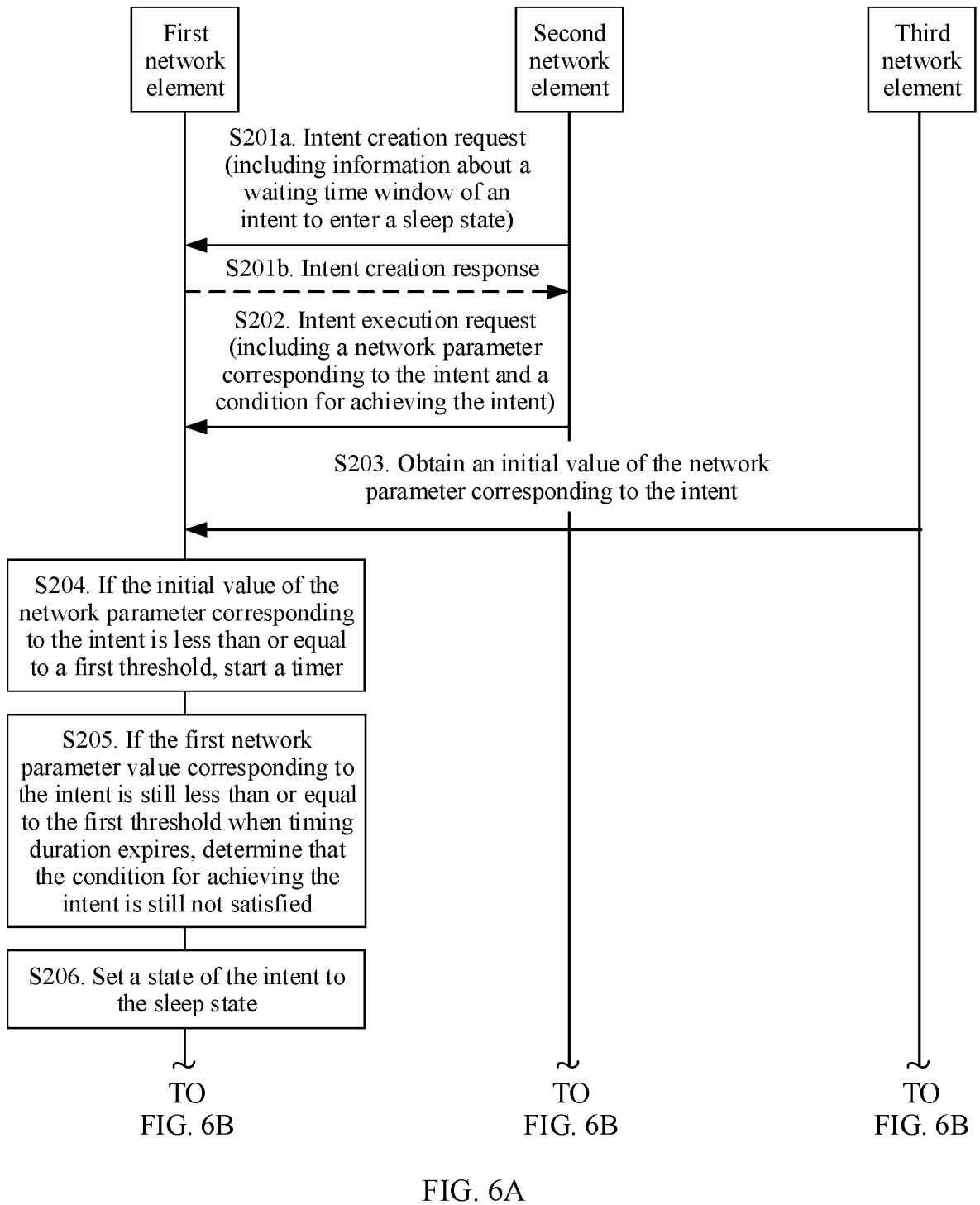
FIG. 6A and FIG. 6B are another schematic flowchart of an intent state management method according to an embodiment of this application.
Figure 6B:
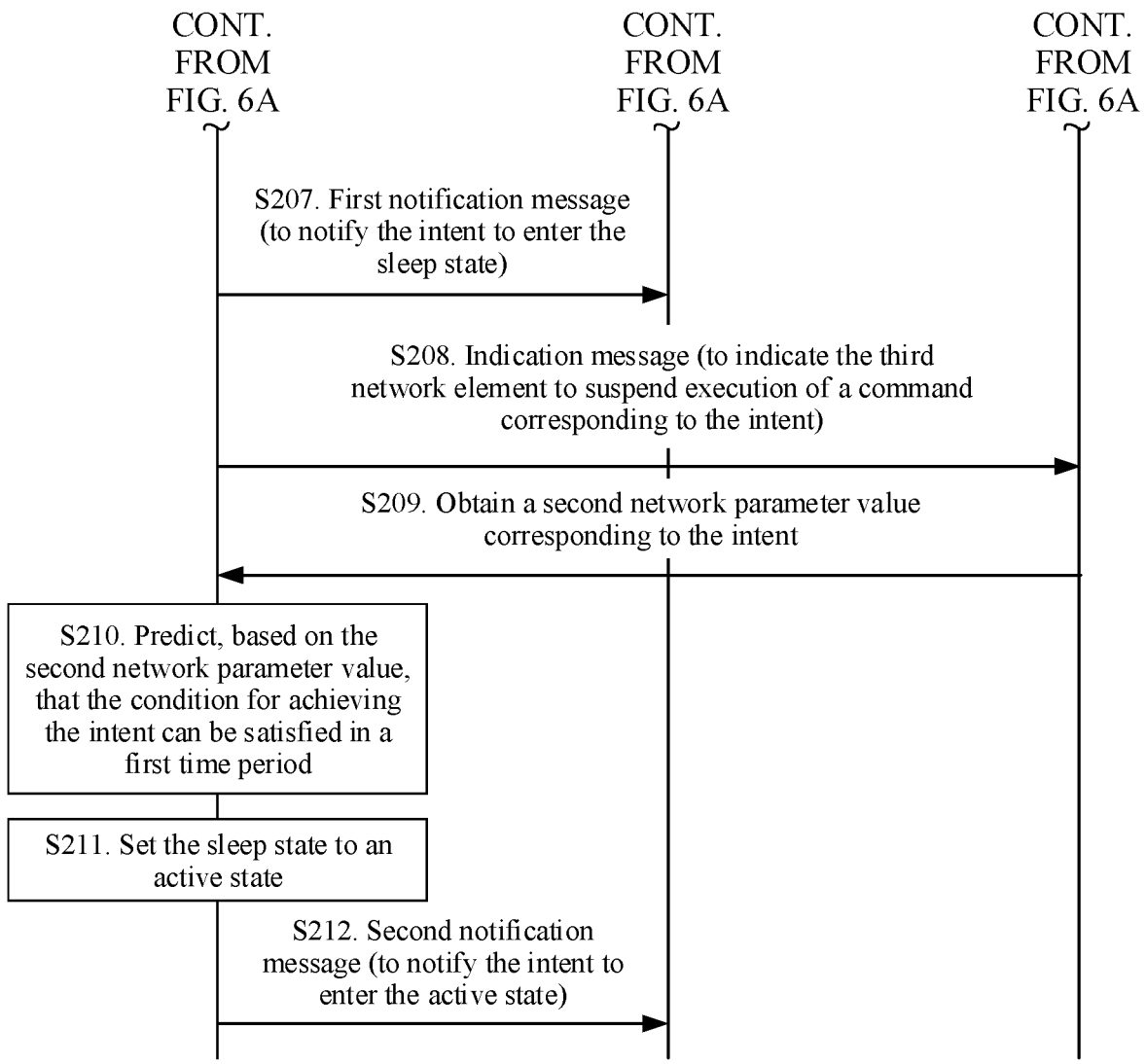

FIG. 6A and FIG. 6B are another schematic flowchart of an intent state management method according to an embodiment of this application. The method may include the following steps:

S201a. A second network element sends an intent creation request to a first network element, where the intent creation request includes information about a waiting time window of an intent that is created by the second network element to enter a sleep state, and the information about the waiting time window of the intent to enter the sleep state includes a window length.

As an intent creator, the second network element may send the intent creation request to the first network element, to request to create the intent. The intent creation request may include an intent identifier, a condition for achieving an intent, and the like.

In this embodiment, the intent creation request further includes the information about the waiting time window of the intent to enter the sleep state. The information about the waiting time window of the intent to enter the sleep state indicates a specific period of time for which the intent needs to wait to enter the sleep state. Specifically, the information about the waiting time window of the intent to enter the sleep state includes the window length of the waiting time window of the intent to enter the sleep state.

In the intent creation request, the window length of the waiting time window of the intent to enter the sleep state is configured for the intent. A window length corresponding to each intent may be different, so that the window length can be configured flexibly.

S201b The first network element sends an intent creation response to the second network element.

This step is optional and is represented by a dashed line in the figure. The intent creation response indicates that the second network element receives the intent creation request, or indicates that intent creation succeeds or fails.

S202. The second network element sends an intent execution request to the first network element, where the intent execution request includes a network parameter corresponding to the intent and a condition for achieving the intent.

After the intent is created, the second network element may immediately request to execute the intent, or trigger a request as required to execute the intent. The second network element may send the intent execution request to the first network element, to request the first network element to execute the intent.

That the first network element executes the intent means to translate the intent, perform operations such as orchestrating the intent into a command executable by a third network element, and transmit the command to the third network element for execution.

When an operation corresponding to the intent is executed, a network parameter value corresponding to the intent needs to be monitored to determine whether the condition for achieving the intent can be satisfied. Therefore, the intent execution request includes the network parameter corresponding to the intent and the condition for achieving the intent.

S203. The first network element obtains, from the third network element, an initial value of the network parameter corresponding to the intent.

An actual network parameter value is a network parameter value actually used when the third network element executes a command corresponding to the intent. The first network element may obtain, from the third network element, the initial value of the network parameter corresponding to the intent.

S204. If the initial value of the network parameter corresponding to the intent is less than or equal to a first threshold, the first network element starts a timer, where timing duration of the timer is the window length of the waiting time window of the intent to enter the sleep state.

It is determined, based on the obtained initial value of the network parameter corresponding to the intent, that if the initial value of the network parameter corresponding to the intent is less than or equal to the first threshold, it may be preliminarily determined that the condition for achieving the intent is not satisfied. However, because the network parameter value always changes, it is determined, based on a network parameter value obtained once corresponding to the intent, that the condition for achieving the intent cannot be satisfied, and execution of the intent is suspended. This may cause erroneous determining and therefore affect intent execution efficiency. Therefore, the first network element may start the timer, and determine whether the condition for achieving the intent can be satisfied within timing duration.

The timing duration of the timer is the window length of the waiting time window of the intent to enter the sleep state, and the window length is configured during intent creation.

S205. If the first network parameter value corresponding to the intent is still less than or equal to the first threshold when the timing duration expires, the first network element determines that the condition for achieving the intent is still not satisfied.

Within the timing duration, the first network element periodically or irregularly obtains, from the third network element, a first network parameter value corresponding to a new intent, and determines whether the first network parameter value corresponding to the intent is still less than or equal to the first threshold. If the first network parameter value corresponding to the intent is still less than or equal to the first threshold when the timing duration expires, the first network element determines that the condition for achieving the intent is still not satisfied. Within the timing duration, if the first network parameter value corresponding to the intent is greater than the first threshold, the first network may determine that the condition for achieving the intent may be satisfied.

S206. The first network element sets a state of the intent to the sleep state.

The first network element sets the state of the intent to the sleep state when determining that the condition for achieving the intent cannot be satisfied.

S207. The first network element sends a first notification message to the second network element, where the first notification message notifies the intent to enter the sleep state.

When the first network element suspends execution of the intent, it is necessary to notify the second network element in time, so that the second network element obtains the state of the intent in time.

S208. The first network element sends an indication message to the third network element, where the indication message indicates the third network element to suspend execution of the command corresponding to the intent.

After suspending execution of the intent, the first network element may send the indication message to the third network element, where the indication message indicates the third network element to suspend execution of the command corresponding to the intent, to save power consumption and network resources of the third network element.

In another implementation, after suspending execution of the intent, the first network element may alternatively not send the indication message to the third network element. If the first network element suspends execution of the intent, the first network element does not send the command corresponding to the intent to the third network element. In this case, after executing a command sent by the first network element before the first network element suspends execution of the intent, the third network element may autonomously suspend execution of the command corresponding to the intent, to save power consumption and network resources of the third network element.

S209. The first network element obtains, from the third network element, a second network parameter value corresponding to the intent.

After suspending execution of the intent, the first network element may attempt to wake up the intent. The first network element obtains, from the third network element, a network parameter value corresponding to a new intent, that is, the second network parameter value. The second network parameter value is a network parameter value corresponding to a current intent after execution of the intent is suspended.

S210. The first network element predicts, based on the second network parameter value, that the condition for achieving the intent can be satisfied in a first time period.

The network parameter corresponding to the intent always changes, and the first network element predicts, based on the newly obtained second network parameter value, whether the condition for achieving the intent can be satisfied in the first time period. A prediction operation may be different from the foregoing described operation of determining, based on the first network parameter value corresponding to the intent, whether the condition for achieving the intent can be satisfied. The prediction is performed by comprehensively determining, based on the second network parameter value, an action of executing the intent by the first network element, the condition for achieving the intent, and the like, whether the condition for achieving the intent can be satisfied within a specific time period.

It may be understood that one or more second network parameter values may be one or more network parameter values obtained at one or more time points, or a network parameter value obtained at one time point and network parameter values obtained at a plurality of time points and predicted based on the network parameter value obtained at the one time point. To be specific, when it is predicted, based on the second network parameter value obtained at a time point, that the condition for achieving the intent cannot be satisfied in the first time period, that is, the intent cannot be woken up, the first network element continues to obtain the second network parameter value. The intent is woken up only when it is predicted, based on the obtained one or more second network parameter values, that the condition for achieving the intent can be satisfied in the first time period.

For example, if it is determined, based on the one or more second network parameter values and an action of executing the intent, that a probability that the condition for achieving the intent is satisfied in the first time period exceeds a preset probability threshold, it may be determined that the condition for achieving the intent can be satisfied in the first time period.

S211. The first network element sets the sleep state to the active state.

When it is predicted that the condition for achieving the intent can be satisfied in the first time period, the first network element wakes up the intent, and sets the sleep state to the active state.

S212. The first network element sends a second notification message to the second network element, where the second notification message notifies the intent to enter the active state.

Accordingly, the second network element receives the second notification message.

After the intent enters the active state, the second network element is notified in time, so that the second network element learns of the state of the intent in time.

According to the intent state management method provided in this embodiment of this application, the network parameter value corresponding to the intent is monitored, and execution of the intent is suspended when the condition for achieving the intent is not satisfied, so that network resources of the first network element can be saved. In addition, when the condition for achieving the intent is satisfied, the intent enters the active state, so that the state of the intent can be adjusted in time, thereby improving intent execution efficiency.

Based on the architecture of the intent state management system shown in FIG. 3, another intent state management method is provided in an embodiment of this application. The method relates to a denormalization and output generation module (which is a module combined by a denormalization module and an output generation module), a cognition management module, a situational awareness module, a context awareness module, a policy management module, a data ingestion and standardization module (which is a module combined by a data ingestion module and a normalization module), and the like of a first network element. FIG. 7A to FIG. 7D are a schematic flowchart of the another intent state management method according to this embodiment of this application. The method may include the following steps:

S301. The context awareness module sends, to the normalization module, a request about whether a condition for achieving an intent is achieved. The request includes an intent identifier, a condition for achieving an intent, and a response period.

Whether the condition for achieving the intent is achieved (or whether the condition for achieving the intent is satisfied) is related to a network parameter value corresponding to the intent. The context awareness module may periodically send, to the normalization module, the request about whether the condition for achieving the intent is achieved. The request may further include the response period, as well as the intent identifier and the condition for achieving the intent. The response period refers to a time range for the normalization module to respond to the context awareness module. If the normalization module does not respond within the response period, the context awareness module may consider that the condition for achieving the intent is not achieved, or the request fails to be sent.

After receiving the request, the normalization module forwards the request to the data ingestion module.

S302. After receiving the request, the data ingestion module obtains, from a third network element, a first network parameter value corresponding to the intent, and sends, to the normalization module, a response about whether the condition for achieving the intent is achieved. The normalization module forwards, to the context awareness module, the response about whether the condition for achieving the intent is achieved. The response includes the intent identifier and the first network parameter value corresponding to the intent.

The third network element is a device that executes a command orchestrated by the first network element. Network parameter values corresponding to the intent include a throughput, a packet loss rate, and the like. For example, in the request sent by the context awareness module, the condition for achieving the intent is that the throughput increases by 20%. After receiving a network parameter value obtaining request from the data ingestion module, the third network element sends a current throughput value to the data ingestion module. The data ingestion module sends a response message to the normalization module. The normalization module forwards the response message to the context awareness module. The response message includes the intent identifier and the current obtained throughput value. The context awareness module determines, based on the current throughput value and the condition for achieving the intent, whether the condition for achieving the intent is achieved.

S303. When the condition for achieving the intent is not satisfied, the context awareness module triggers a timing mechanism, and if the condition for achieving the intent is still not satisfied after timing duration expires, it is determined that the condition for achieving the intent cannot be satisfied temporarily.

When the context awareness module determines that the condition for achieving the intent is not satisfied, a timer is started. Timing duration of the timer is a window length of a waiting time window of the intent to enter a sleep state. Within the timing duration, the context awareness module may obtain, for one or more times, one or more first network parameter values corresponding to the intent. If the context awareness module determines, within the timing duration based on the one or more first network parameter values that correspond to the intent and that are obtained one or more times, that the condition for achieving the intent is still not satisfied, the context awareness module determines that the intent cannot be satisfied temporarily, and timing stops. If the context awareness module determines, within the timing duration based on the obtained first network parameter value corresponding to the intent, that the condition for achieving the intent can be satisfied, the context awareness module determines that the condition for achieving the intent is achieved, and the timer stops.

When determining that the condition for achieving the intent cannot be satisfied temporarily, the context awareness module modifies a state of the intent from an active state to the sleep state.

S304. The context awareness module sends an intent execution suspension request to the policy management module.

When the context awareness module determines that the condition for achieving the intent cannot be satisfied temporarily, if the intent state management system continues to perform operations on the intent, resources are wasted. Therefore, the context awareness module sends the intent execution suspension request to the policy management module.

S305. After receiving the intent execution suspension request, the policy management module suspends execution of the intent, and sends an intent execution suspension response to the context awareness module.

The policy management module is an intent decision module, which obtains the first network parameter value corresponding to the intent to match an intent execution condition (a network parameter value corresponding to the intent), to obtain a command that needs to be executed. Currently, the policy management module suspends execution of the intention after receiving the intent execution suspension request. The intent execution suspension response notifies the context awareness module that execution of the intent has been suspended.

The context awareness module is responsible for managing the state of intent. After receiving the response message, the context awareness module may modify the state of the intent from the active state to the sleep state.

S306-1. The policy management module sends an intent notification to the denormalization module, and the denormalization module forwards the intent notification to the output generation module, where the notification notifies that a current state of the intent is the sleep state.

After sending the intent execution suspension response to the context awareness module, the policy management module determines that the current state of the intent is the sleep state, and may notify a second network element that the current state of the intent is the sleep state. The policy management module sends the notification to the second network element by using output modules, that is, the denormalization module and the output generation module.

S306-2. The output generation module sends the notification to the second network element.

After receiving the notification, the second network element may learn that the current state of the intent is the sleep state, that is, the intent state management system does not currently perform a further operation on the intent.

It may be understood that after the policy management module sends the intent execution suspension response to the context awareness module, the policy management module suspends execution of the intent, and stops sending an execution command to the third network element. The third network element also suspends execution of the command, to save network resources and power consumption of the third network element.

S307. The policy management module sends an intent wakeup request to the situational awareness module, where the intent wakeup request includes the intent identifier, a network parameter corresponding to the intent, and the condition for achieving the intent.

After the intent enters the sleep state, the policy management module may immediately or periodically send the intent wakeup request to the situational awareness module. The intent wakeup request requests to wake up the intent. The intent wakeup request includes the intent identifier, the network parameter corresponding to the intent, and the condition for achieving the intent. The foregoing information carried in the intent wakeup request is used by the situational awareness module to predetermine whether the intent may be woken up.

S308. The situational awareness module sends a prediction request to the cognition management module.

The situational awareness module may predict, based on a second network parameter value corresponding to the intent, whether the intent can be woken up. First, the situational awareness module needs to obtain second network parameter values corresponding to real-time and predicted intents. Therefore, the situational awareness module sends the prediction request to the cognition management module. The prediction request requests to obtain the second network parameter values corresponding to the current and predicted intents.

S309. The cognition management module sends a network parameter value obtaining request to the context awareness module.

After receiving the network parameter value obtaining request sent by the situational awareness module, the cognition management module sends the network parameter value obtaining request to the context awareness module. The network parameter value obtaining request requests to obtain the second network parameter value corresponding to the current intent.

S310. After obtaining the second network parameter value corresponding to the intent, the context awareness module sends a network parameter value obtaining response to the cognition management module.

The context awareness module may obtain, from the third network element by using the data ingestion module and the normalization module, the second network parameter value corresponding to the intent. After obtaining the second network parameter value corresponding to the intent, the context awareness module sends the network parameter value obtaining response to the cognition management module. The network parameter value obtaining response includes the second network parameter value corresponding to the current intent.

S311. After receiving the second network parameter value that corresponds to the intent and that is sent by the context awareness module, the cognition management module performs prediction based on the second network parameter value corresponding to the intent, and sends a prediction response to the situational awareness module.

After receiving the second network parameter value that corresponds to the intent and that is sent by the context awareness module, the cognition management module predicts, based on the second network parameter value corresponding to the intent, a network parameter value corresponding to the intent, that is, predicts a network parameter value corresponding to the intent in a time period. Then, the cognition management module sends, to the situational awareness module, a network parameter value prediction response corresponding to the intent. The network parameter value prediction response corresponding to the intent includes network parameter values corresponding to the current and predicted intents.

S312. The situational awareness module predicts whether the network parameter value corresponding to the intent can satisfy the condition for achieving the intent.

The situational awareness module determines, based on received network parameter value information (the network parameter values corresponding to the current and predicted intents) corresponding to the intent and the condition for achieving the intent (or referred to as a parameter value for achieving the intent), whether the condition for achieving the intent is achieved. For example, the condition for achieving the intent is that a throughput increases by 20%. Assuming that a current obtained throughput is A, and a predicted throughput is 25%*A, it may be determined that the condition for achieving the intent can be achieved. The situational awareness module sends an intent wakeup response to the policy management module, where the intent wakeup response indicates that the condition for achieving the intent can be achieved.

It may be understood that, after the policy management module sends the intent wakeup request to the situational awareness module, if the situational awareness module determines, for the first time, that the condition for achieving the intent is not achieved, the foregoing steps S308 to S312 may be performed again. To be specific, the foregoing steps S308 to S312 are cyclically performed actions, and the cyclic actions stop when the situational awareness module determines that the condition for achieving the intent can be achieved.

S313. The situational awareness module sends the intent wakeup response to the policy management module. The intent wakeup response includes the intent identifier and the second network parameter value corresponding to the intent.

The situational awareness module sends the intent wakeup response to the policy management module, where the intent wakeup response indicates that the condition for achieving the intent can be achieved. The intent wakeup response includes the intent identifier and a network parameter value corresponding to a current intent.

S314. The policy management module sends an intent activation request to the context awareness module. The intent activation request includes the intent identifier.

After receiving the intent wakeup response, if the policy management module determines that the condition for achieving the intent can be satisfied, the policy management module sends the intent activation request to the context awareness module. The intent activation request requests to activate the intent.

S315. After receiving the intent activation request, the context awareness module modifies the intent from the sleep state to the active state.

The context awareness module manages the state of the intent, and modifies the intent from the sleep state to the active state after receiving the intent activation request.

S316. The context awareness module sends a response to the intent activation request to the policy management module.

The response to the intent activation request indicates that the intent has entered the active state from the sleep state.

S317a. The policy management module sends a decision to the denormalization module, and the denormalization module sends a command corresponding to the decision to the output generation module.

After the intent enters the active state, the policy management module may continue to perform operations on the intent. The policy management module sends the decision to the denormalization module. The decision is a result of continuing the operations on the intent.

After receiving the decision, the denormalization module converts the decision into a command that can be identified by the third network element. The denormalization module sends the command to the output generation module.

S318a. The output generation module sends the command to the third network element.

After receiving the command, the output generation module forwards the command to the third network element.

After receiving the command from the policy management module, the third network element executes the command.

S317b. The policy management module sends the intent notification to the denormalization module. The denormalization module forwards the intent notification to the output generation module.

After the intent re-enters the active state, the policy management module sends a notification to the second network element. The intent notification notifies that the state of the intent is the active state. The notification is forwarded by the denormalization module and the output generation module.

S318b. The output generation module forwards the notification to the second network element.

According to the intent state management method provided in this embodiment of this application, when the condition for achieving the intent cannot be satisfied, the intent enters the sleep state in time, and the first network element no longer performs operations on the intent, so that network resources of the first network element and/or the third network element can be saved. In addition, when the condition for achieving the intent is satisfied, the intent re-enters the active state in time, so that the intent is executed in time.

Based on the architecture of the intent state management system shown in FIG. 3, still another intent state management method is provided in an embodiment of this application. FIG. 8A to FIG. 8D are a schematic flowchart of the still another intent state management method according to this embodiment of this application. Differences between this embodiment and the embodiment shown in FIG. 7A to FIG. 7D lie in steps S407 and S413 to S416. The method may include the following steps:

S401. The context awareness module sends, to the data ingestion module, a request about whether a condition for achieving an intent is achieved, and the data ingestion module forwards the request to the normalization module. The request includes an intent identifier, a condition for achieving an intent, and a response period.

For specific implementation of this step, refer to step S301 in the embodiment shown in FIG. 7A.

S402. After receiving the request, the normalization module obtains, from a third network element, a first network parameter value corresponding to the intent, and sends, to the context awareness module, a response about whether the condition for achieving the intent is achieved. The response includes the intent identifier and the first network parameter value corresponding to the intent.

For specific implementation of this step, refer to step S302 in the embodiment shown in FIG. 7A.

S403. When the condition for achieving the intent is not satisfied, the context awareness module triggers a timing mechanism, and if the condition for achieving the intent is still not satisfied after a preset time, it is determined that the intent cannot be satisfied temporarily.

For specific implementation of this step, refer to step S303 in the embodiment shown in FIG. 7A.

S404. The context awareness module sends an intent execution suspension request to the policy management module.

For specific implementation of this step, refer to step S304 in the embodiment shown in FIG. 7B.

S405. After receiving the intent execution suspension request, the policy management module suspends execution of the intent, and sends an intent execution suspension response to the context awareness module.

For specific implementation of this step, refer to step S305 in the embodiment shown in FIG. 7B.

S406-1. The policy management module sends an intent notification to the denormalization module, and the denormalization module forwards the intent notification to the output generation module, where the notification notifies that a current state of the intent is a sleep state.

For specific implementation of this step, refer to step S306-1 in the embodiment shown in FIG. 7B.

S406-2. After receiving the notification, the output generation module forwards the notification to a second network element.

For specific implementation of this step, refer to step S306-2 in the embodiment shown in FIG. 7B.

S407. The context awareness module sends an intent wakeup request to the situational awareness module, where the intent wakeup request includes the intent identifier, a network parameter corresponding to the intent, and the condition for achieving the intent. The foregoing information carried in the intent wakeup request is used by the situational awareness module to predetermine whether the intent may be woken up.

In this embodiment, the context awareness module sends the intent wakeup request to the situational awareness module. For a specific implementation process, refer to step S307 in the embodiment shown in FIG. 7B.

S408. The situational awareness module sends a prediction request to the cognition management module.

For specific implementation of this step, refer to step S308 in the embodiment shown in FIG. 7B.

S409. The cognition management module sends a network parameter value obtaining request to the context awareness module.

For specific implementation of this step, refer to step S309 in the embodiment shown in FIG. 7B.

S410. After obtaining a second network parameter value corresponding to the intent, the context awareness module sends a network parameter value obtaining response to the cognition management module.

For specific implementation of this step, refer to step S310 in the embodiment shown in FIG. 7C.

S411. After receiving the second network parameter value that corresponds to the intent and that is sent by the context awareness module, the cognition management module performs prediction on the second network parameter value corresponding to the intent, and sends a prediction response to the situational awareness module.

For specific implementation of this step, refer to step S311 in the embodiment shown in FIG. 7C.

S412. The situational awareness module predicts, based on the second network parameter value corresponding to the intent, whether the condition for achieving the intent can be achieved.

For specific implementation of this step, refer to step S312 in the embodiment shown in FIG. 7C.

S413. The situational awareness module sends an intent wakeup response to the context awareness module.

The intent wakeup response indicates that the condition for achieving the intent can be satisfied. The intent wakeup response includes the intent identifier and a second network parameter value corresponding to a current intent.

S414. The context awareness module sends an intent execution request to the policy management module. The intent execution request includes the intent identifier.

After receiving the intent wakeup response, if the context awareness module determines that the condition for achieving the intent can be achieved, the context awareness module sends the intent execution request to the policy management module. The intent execution request requests the policy management module to execute the intent.

S415. After receiving the intent execution request, the policy management module executes the intent, and sends an intent execution response to the context awareness module.

The intent execution response notifies the context awareness module that execution of the intent has started to be re-executed.

S416. The context awareness module receives the intent execution response, and modifies the intent from the sleep state to an active state.

After receiving the intent execution response, if the context awareness module determines that the policy management module has started to re-execute the intent, the context awareness module modifies the intent from the sleep state to the active state.

S417a. The policy management module sends a decision to the denormalization module, and the denormalization module forwards a command corresponding to the decision to the output generation module.

For specific implementation of this step, refer to step S317a in the embodiment shown in FIG. 7D.

S418a. After receiving the command, the output generation module sends the command to the third network element.

For specific implementation of this step, refer to step S318a in the embodiment shown in FIG. 7D.

S417b. The policy management module sends an intent notification to the denormalization module, and the denormalization module forwards the intent notification to the output generation module, where the intent notification notifies that the state of the intent is the active state.

For specific implementation of this step, refer to step S317b in the embodiment shown in FIG. 7D.

S418b. After receiving the notification, the output generation module forwards the notification to the second network element.

For specific implementation of this step, refer to step S318b in the embodiment shown in FIG. 7D.

According to the intent state management method provided in this embodiment of this application, when the condition for achieving the intent cannot be achieved, the intent enters the sleep state in time, and the intent state management system no longer performs operations on the intent, so that network resources of the intent state management system and/or the third network element can be saved. In addition, when the condition for achieving the intent can be achieved, the intent re-enters the active state in time, ensuring timely execution of the intent.

Figure 8D:
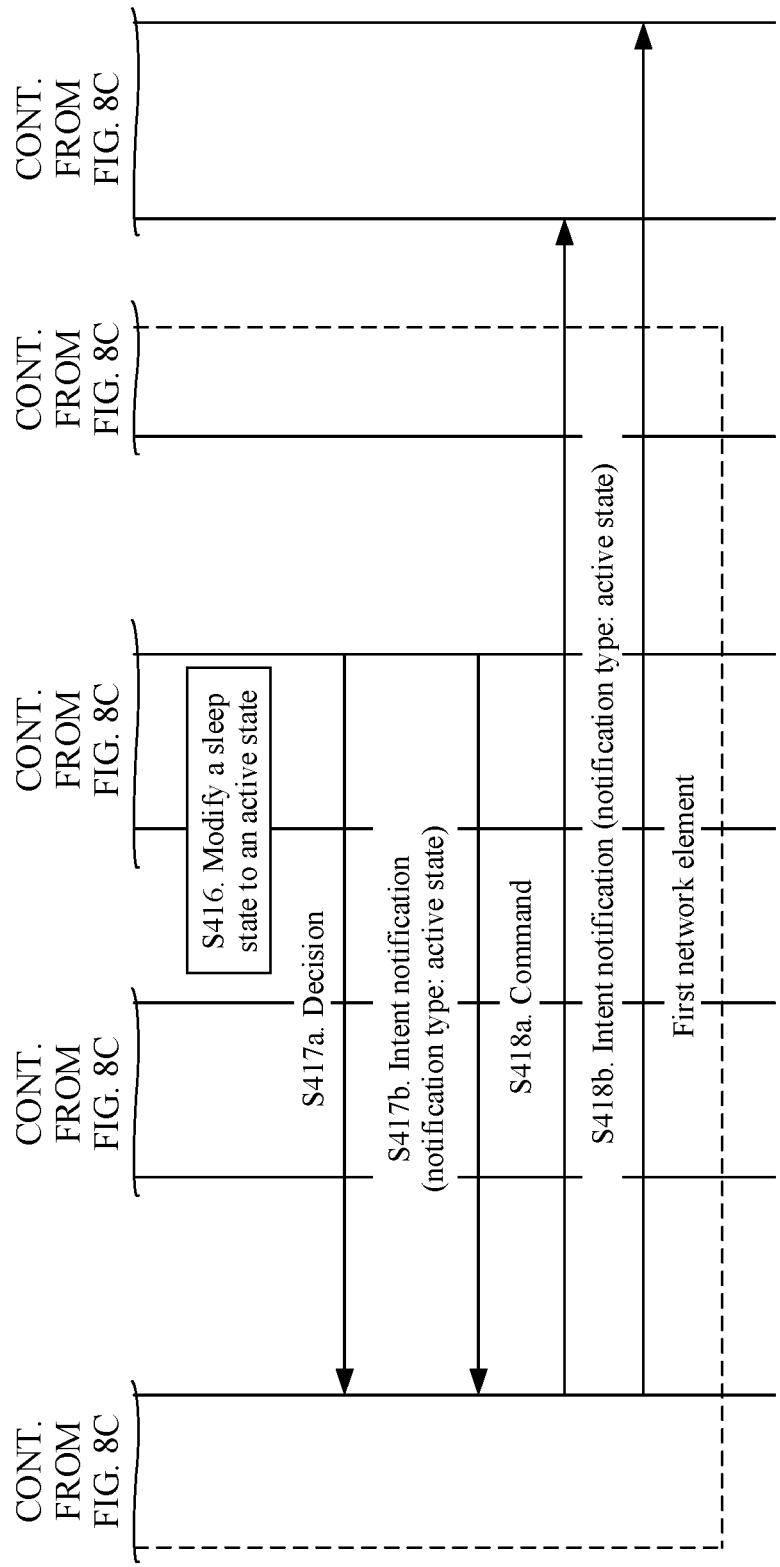
Figure 9A:
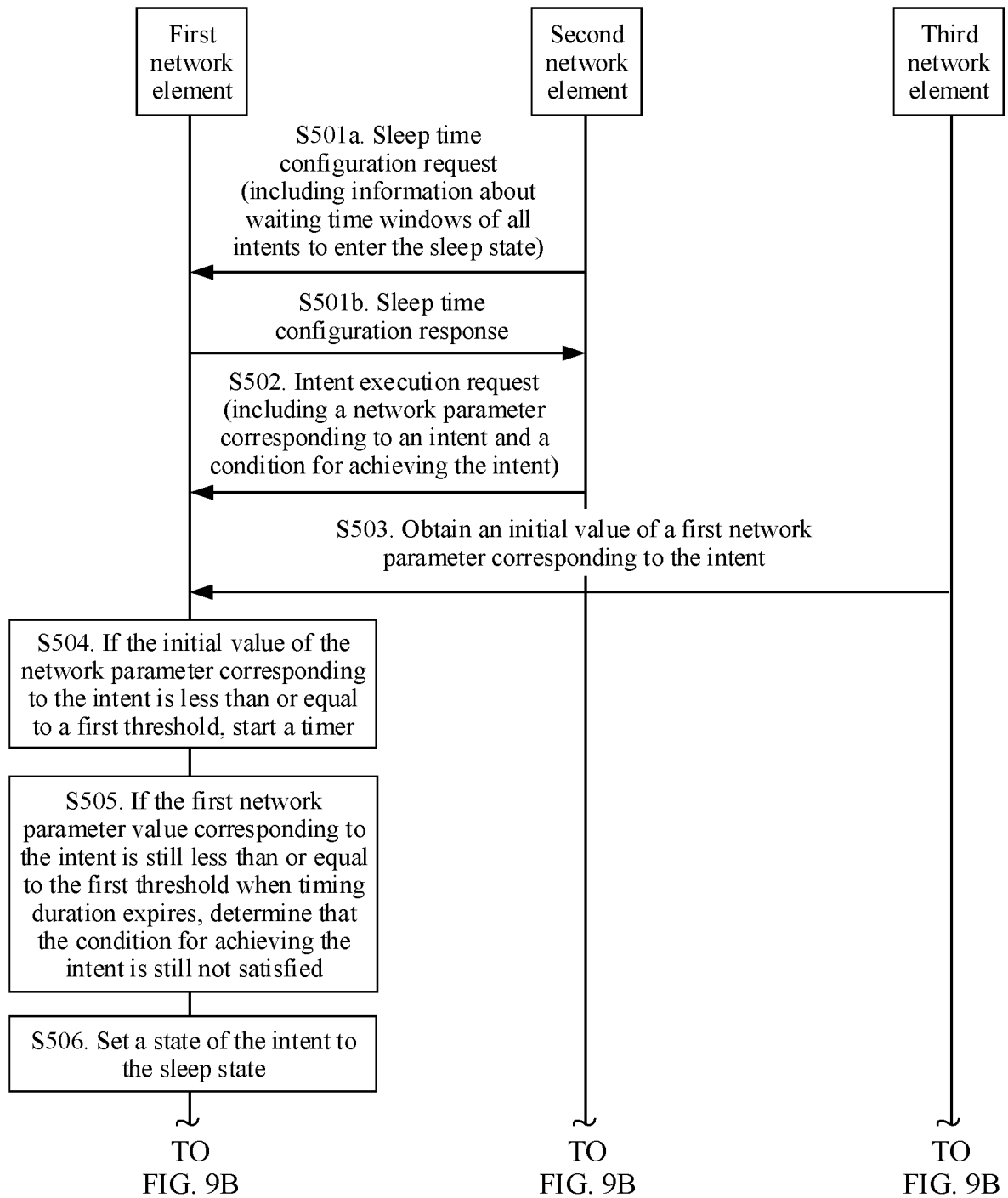
FIG. 9A and FIG. 9B are still another schematic flowchart of an intent state management method according to an embodiment of this application.
Figure 9B:
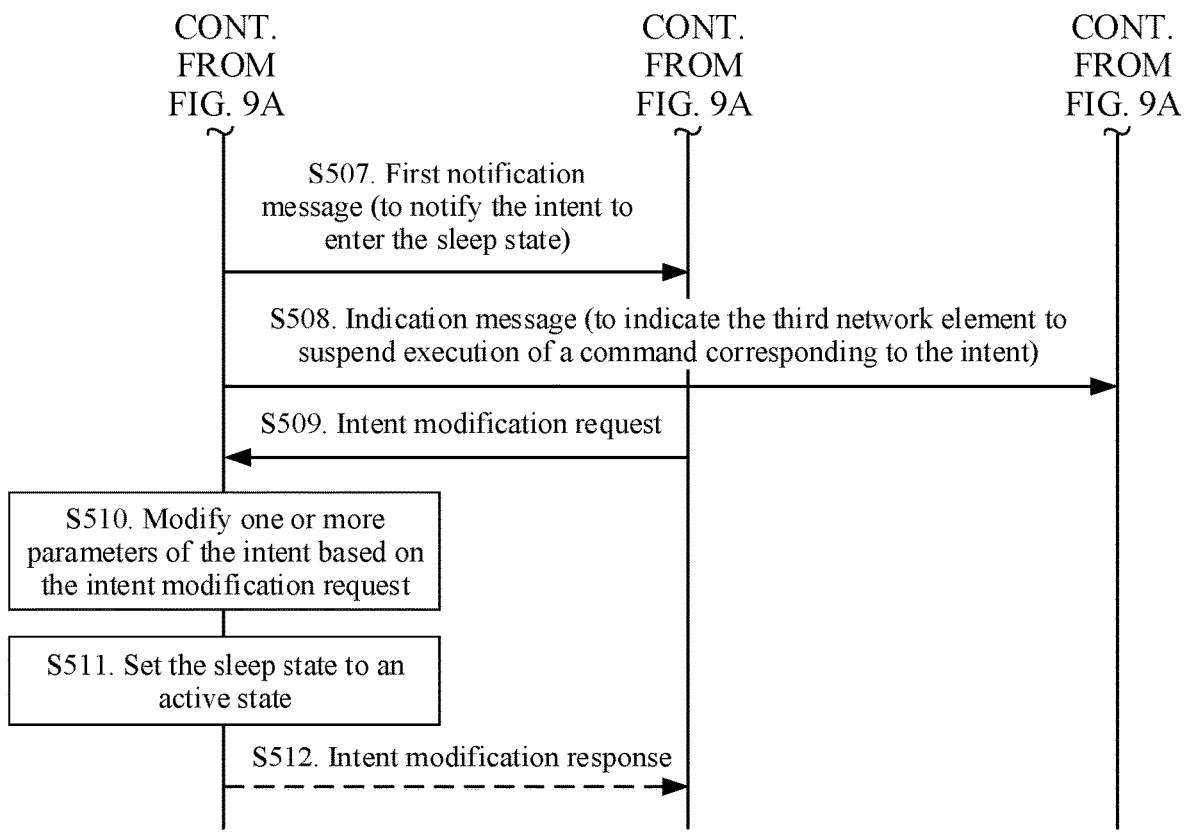

FIG. 9A and FIG. 9B are still another schematic flowchart of an intent state management method according to an embodiment of this application. A difference between this embodiment and the embodiments shown in FIG. 6A to FIG. 8D lies in that an intent may be modified and activated based on an intent modification request of a second network element, so that the intent enters an active state from a sleep state. Specifically, the method may include the following steps:

S501a. The second network element sends a sleep time configuration request to a first network element, where the sleep time configuration request includes information about waiting time windows of all intents that are created by the second network element to enter the sleep state, and the information about the waiting time windows of all the intents to enter the sleep state includes window lengths.

In this embodiment, the second network element may uniformly configure the waiting time windows of all intents to enter the sleep state for all the intents that are created by the second network element. The configuration efficiency can be improved by uniformly configuring the waiting time windows of all the intents to enter the sleep state.

S501b. The first network element sends a sleep time configuration response to the second network element.

This step is optional and is represented by a dashed line in the figure. The sleep time configuration response indicates that the first network element receives the sleep time configuration request, or indicates that sleep time configuration succeeds or fails.

S502. The second network element sends an intent execution request to the first network element, where the intent execution request includes a network parameter corresponding to the intent and a condition for achieving the intent.

For specific implementation of this step, refer to step S202 in the embodiment shown in FIG. 6A.

S503. The first network element obtains, from a third network element, an initial value of a first network parameter corresponding to the intent.

For specific implementation of this step, refer to step S203 in the embodiment shown in FIG. 6A.

S504. If the initial value of the network parameter corresponding to the intent is less than or equal to a first threshold, the first network element starts a timer, where timing duration of the timer is a window length of a waiting time window of an intent to enter the sleep state.

For specific implementation of this step, refer to step S204 in the embodiment shown in FIG. 6A.

S505. If the first network parameter value corresponding to the intent is still less than or equal to the first threshold when the timing duration expires, the first network element determines that the condition for achieving the intent is still not satisfied.

For specific implementation of this step, refer to step S205 in the embodiment shown in FIG. 6A.

S506. The first network element sets a state of the intent to the sleep state.

For specific implementation of this step, refer to step S206 in the embodiment shown in FIG. 6A.

S507. The first network element sends a first notification message to the second network element, where the first notification message notifies the intent to enter the sleep state.

For specific implementation of this step, refer to step S207 in the embodiment shown in FIG. 6B.

S508. The first network element sends an indication message to the third network element, where the indication message indicates the third network element to suspend execution of a command corresponding to the intent.

For specific implementation of this step, refer to step S208 in the embodiment shown in FIG. 6B.

S509. The first network element receives an intent modification request from the second network element, where the intent modification request requests to modify one or more parameters of the intent: the condition for achieving the intent, an intent command impact area, an intent priority, and an execution sequence of the intent.

After learning that the intent enters the sleep state, the second network element may request to modify the intent.

Specifically, a request may be made to modify the condition for achieving the intent. For example, before the intent enters the sleep state, a condition for achieving the intent carried in the intent execution request sent by the second network element is that throughputs of N base station devices in a geographic area increase by 20%. However, because it is determined, based on the first network parameter value corresponding to the intent, that the condition for achieving the intent cannot be satisfied, the second network element may modify the condition for achieving the intent, for example, modify the condition for achieving the intent to that the throughputs of the N base station devices in the geographic area increase by 15%. Because the condition for achieving the intent is modified, it is determined, based on the network parameter value corresponding to the intent, that the modified condition for achieving the intent can be satisfied, that is, the intent may be successfully executed by the first network element.

A request may further be made to modify the intent command impact area. For example, if it is determined, based on the first network parameter value corresponding to the intent, that throughputs of only M base station devices can be met, where M<N, the intent command impact area is modified. For example, the condition for achieving the intent is modified to that throughputs of M base station devices in a geographic area increase by 20%. Because the condition for achieving the intent is modified, it is determined, based on the network parameter value corresponding to the intent, that the modified condition for achieving the intent can be satisfied, that is, the intent may be successfully executed by the first network element.

A request may further be made to modify the intent priority. Specifically, the intent priority is increased, so that network resources occupied by the intent may be increased by the first network element/the third network element. Because the condition for achieving the intent is modified, it is determined, based on the network parameter value corresponding to the intent, that the modified condition for achieving the intent can be satisfied, that is, the intent may be successfully executed by the first network element.

A request may further be made to modify the execution sequence of the intent. The execution sequence of the intent is modified. For example, the execution sequence of the intent is advanced, that is, the intent is more important than another intent. In this case, network resources occupied by the intent may be increased by the first network element/the third network element, so that the intent is successfully executed. Because the condition for achieving the intent is modified, it is determined, based on the network parameter value corresponding to the intent, that the modified condition for achieving the intent can be satisfied, that is, the intent may be successfully executed by the first network element.

S510. The first network element modifies the one or more parameters of the intent based on the intent modification request.

After receiving the intent modification request, the first network element modifies the one or more parameters of the intent based on the one or more parameters of the intent carried in the intent modification request.

S511. The first network element sets the sleep state to the active state.

After the one or more parameters of the intent are modified, the intent may be activated, and the sleep state is set to the active state.

S512. The first network element sends an intent modification response to the second network element.

This step is optional and is represented by a dashed line in the figure. The intent modification response indicates that the one or more parameters of the intent are modified.

According to the intent state management method provided in this embodiment of this application, the first network element sets the sleep state to the active state when the condition for achieving the intent is satisfied or the intent is modified. The network parameter value corresponding to the intent is monitored, and execution of the intent is suspended when the condition for achieving the intent is not satisfied, so that network resources of the first network element can be saved. In addition, when the intent is modified, the intent enters the active state, so that the state of the intent can be adjusted in time, thereby improving intent execution efficiency.

Figure 10A:
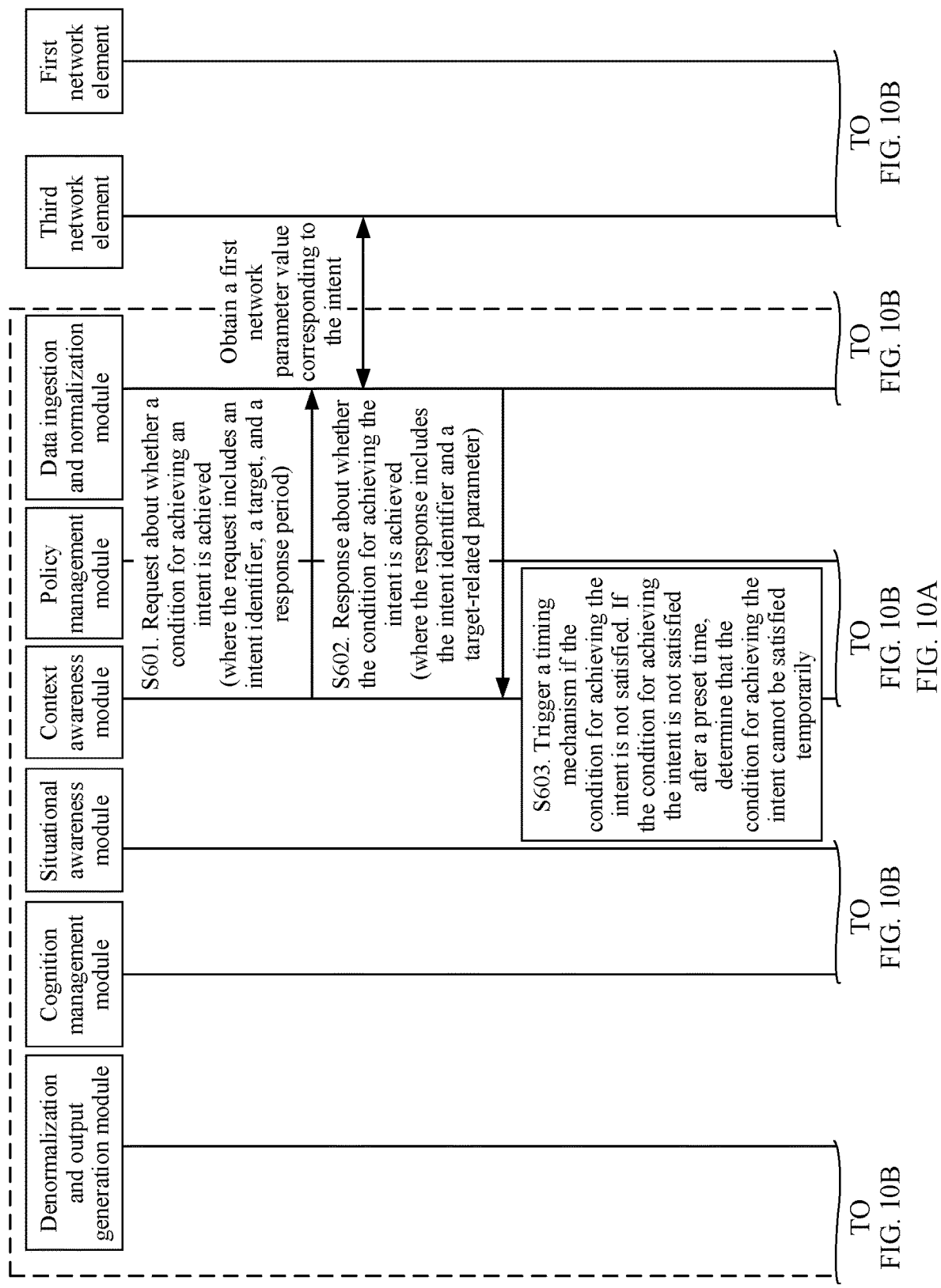
Figure 10C:
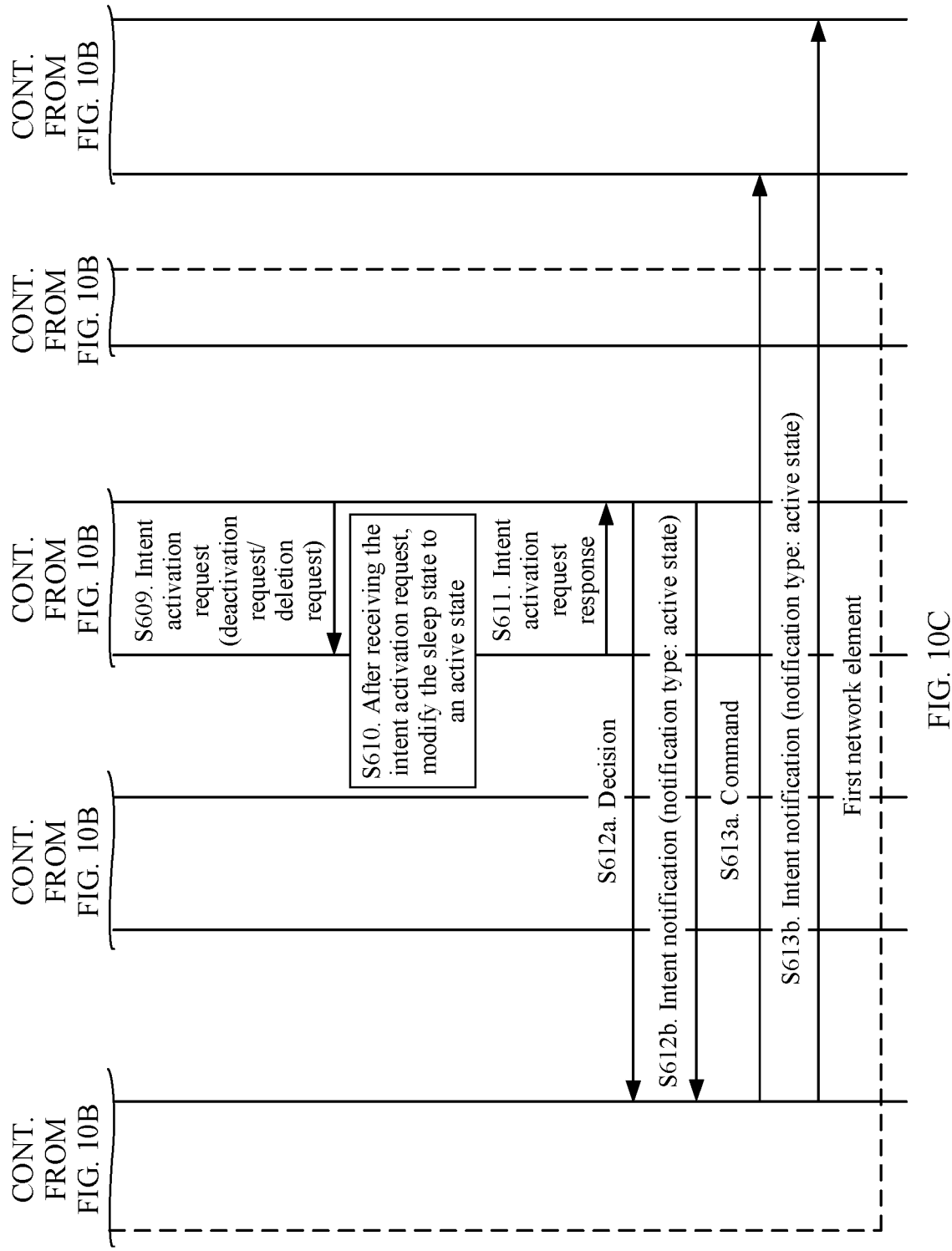

Based on the architecture of the intent state management system shown in FIG. 4, still another intent state management method is provided in an embodiment of this application. FIG. 10A to FIG. 10C are a schematic flowchart of the still another intent state management method according to this embodiment of this application. Differences between this embodiment and the embodiments shown in FIG. 7A to FIG. 8D lie in steps S607 to S611. The method may include the following steps:

S601. The context awareness module sends, to the data ingestion module, a request about whether a condition for achieving an intent is achieved, and the data ingestion module forwards the request to the normalization module. The request includes an intent identifier, a condition for achieving an intent, and a response period.

For specific implementation of this step, refer to step S301 in the embodiment shown in FIG. 7A, or refer to step S401 in the embodiment shown in FIG. 8A.

S602. After receiving the request, the normalization module obtains, from a third network element, a first network parameter value corresponding to the intent, and sends, to the context awareness module, a response to the request about whether the condition for achieving the intent is achieved. The response includes the intent identifier and a parameter related to the condition for achieving the intent.

For specific implementation of this step, refer to step S302 in the embodiment shown in FIG. 7A, or refer to step S402 in the embodiment shown in FIG. 8A.

S603. When the condition for achieving the intent is not satisfied, the context awareness module triggers a timing mechanism, and if the condition for achieving the intent is still not satisfied after a preset time, it is determined that the condition for achieving the intent cannot be satisfied temporarily.

For specific implementation of this step, refer to step S303 in the embodiment shown in FIG. 7A, or refer to step S403 in the embodiment shown in FIG. 8A.

S604. The context awareness module sends an intent execution suspension request to a policy management module.

For specific implementation of this step, refer to step S304 in the embodiment shown in FIG. 7B, or refer to step S404 in the embodiment shown in FIG. 8B.

S605. After receiving the intent execution suspension request, the policy management module suspends execution of the intent, and sends an intent execution suspension response to the context awareness module.

For specific implementation of this step, refer to step S305 in the embodiment shown in FIG. 7B, or refer to step S405 in the embodiment shown in FIG. 8B.

S606-1. The policy management module sends an intent notification to the denormalization module, and the denormalization module forwards the intent notification to the output generation module, where the notification notifies that a current state of the intent is a sleep state.

For specific implementation of this step, refer to step S306-1 in the embodiment shown in FIG. 7B, or refer to step S407 in the embodiment shown in FIG. 8B.

S606-2. After receiving the notification, the output generation module forwards the notification to the second network element.

For specific implementation of this step, refer to step S306-2 in the embodiment shown in FIG. 7B, or refer to step S407 in the embodiment shown in FIG. 8B.

After receiving the notification that the intent is in the sleep state, the second network element may deliver an intent modification indication, for example, elevate an intent priority, or may send an intent deactivation indication, or may send an intent deletion indication. The following uses delivering an intent modification indication as an example for description.

S607. The second network element sends the intent modification indication to the data ingestion module, and the data ingestion module forwards the intent modification indication to the normalization module.

The second network element sends the intent modification indication to the policy management module by using input modules, that is, the data ingestion module and the normalization module, for example, the intent modification indication is to elevate an intent priority. The intent modification indication includes the intent identifier.

S608. The normalization module forwards the intent modification indication to the policy management module.

S609. The policy management module sends an intent activation request to the context awareness module.

After receiving the intent modification indication, if the policy management module determines that the intent needs to be activated, and the policy management module sends the intent activation request to the context awareness module. The intent activation request requests to activate the intent. The intent activation request includes the intent identifier.

It may be understood that, if the second network element sends the intent deactivation indication, the policy management module sends an intent deactivation request to the context awareness module. If the second network element sends the intent deletion indication, the policy management module sends an intent deletion request to the context awareness module.

S610. After receiving the intent activation request, the context awareness module modifies the sleep state to the active state.

It may be understood that, if the second network element sends the intent deactivation indication, after receiving the intent deactivation indication, the context awareness module modifies the sleep state to a deactive state. If the second network element sends the intent deletion indication, after receiving the intent deletion indication, the context awareness module modifies the sleep state to an intent deletion state.

S611. The context awareness module sends a request to the intent activation request to the policy management module.

The response to the intent activation request notifies the policy management module that the intent enters the active state.

It may be understood that, if the policy management module sends the intent deactivation request to the context awareness module, the context awareness module sends a response to the intent deactivation request to the policy management module. It may be understood that, if the policy management module sends the intent deletion request to the context awareness module, the context awareness module sends an intent deletion response to the policy management module.

S612a. The policy management module sends a decision to the denormalization module, and the denormalization module sends an identifiable command corresponding to the decision to the output generation module.

For specific implementation of this step, refer to step S317a in the embodiment shown in FIG. 7D, or refer to step S417a in the embodiment shown in FIG. 8D.

S613a. After receiving the command, the output generation module forwards the command to the third network element.

For specific implementation of this step, refer to step S318a in the embodiment shown in FIG. 7D, or refer to step S418a in the embodiment shown in FIG. 8D.

S612b. The policy management module sends the intent notification to the denormalization module, and the denormalization module forwards the intent notification to the output generation module, where the intent notification notifies that the state of the intent is the active state.

For specific implementation of this step, refer to step S317b in the embodiment shown in FIG. 7D, or refer to step S417b in the embodiment shown in FIG. 8D.

S613b. After receiving the intent notification, the output generation module forwards the notification to the second network element.

For specific implementation of this step, refer to step S318b in the embodiment shown in FIG. 7D, or refer to step S418b in the embodiment shown in FIG. 8D.

According to the intent state management method provided in this embodiment of this application, when an intent target cannot be achieved, the intent enters the sleep state in time, and the intent state management system no longer performs operations on the intent, so that resources of the intent state management system and/or the third network element can be saved. In addition, after obtaining the notification that the intent enters the sleep state, the second network element may modify the intent, for example, elevate the intent priority, so that the intent re-enters the active state. In addition, the second network element may further deactivate the intent or delete the intent.

Figure 11:
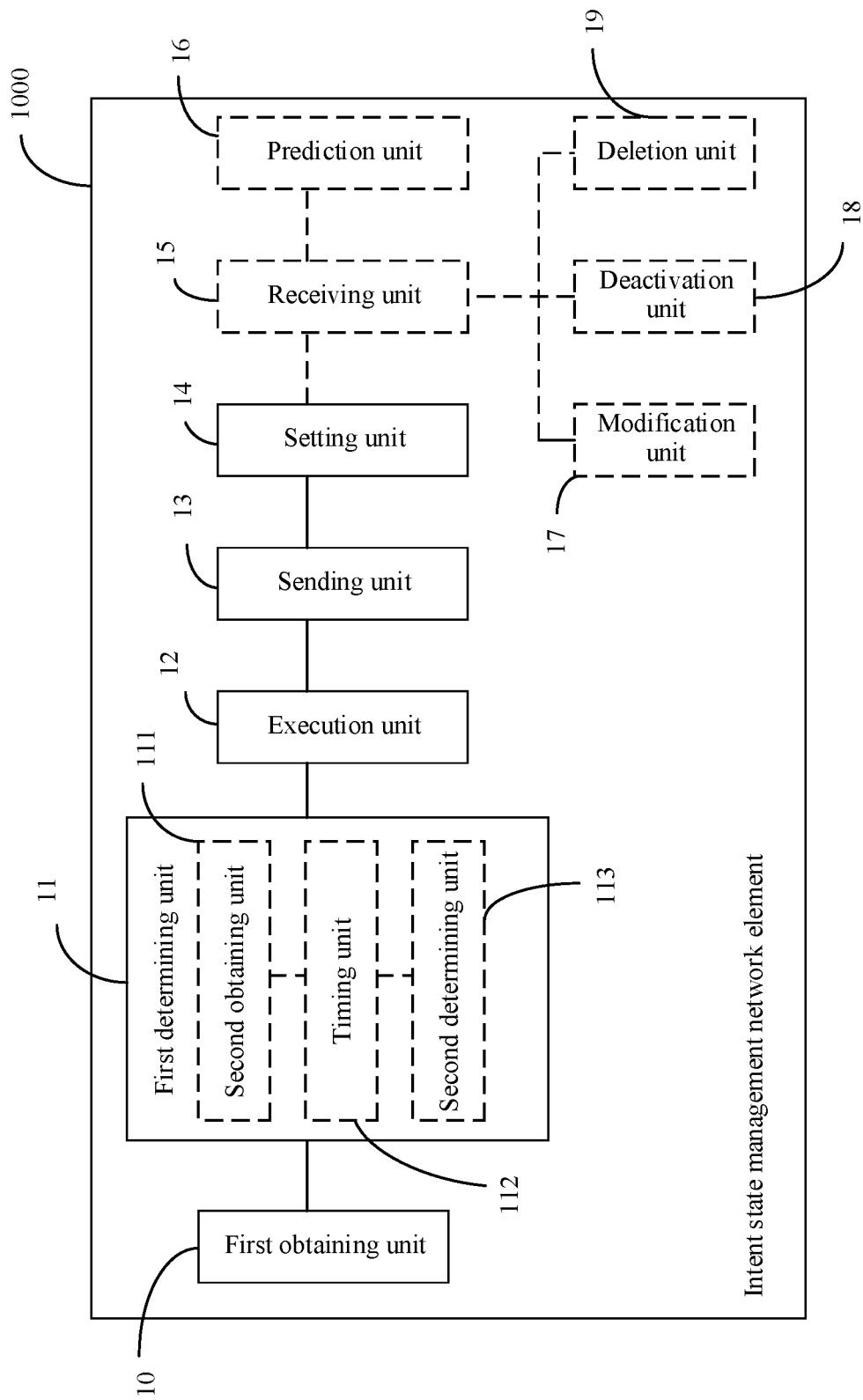
FIG. 11 is a schematic diagram of a modular structure of an intent state management network element according to an embodiment of this application.

Based on a same concept as the intent state management method, this application further provides an intent state management network element. The intent state management network element may be the first network element 200 shown in FIG. 3. FIG. 11 is a schematic diagram of a modular structure of an intent state management network element according to an embodiment of this application. The intent state management network element 1000 includes:

a first obtaining unit 10, configured to obtain a first network parameter value corresponding to an intent; a first determining unit 11, configured to determine, based on the first network parameter value corresponding to the intent, that a condition for achieving the intent is not satisfied; an execution unit 12, configured to suspend execution of the intent; a sending unit 13, configured to send a first notification message, where the first notification message notifies the intent to enter a sleep state; and a setting unit 14, configured to set the sleep state to an active state when the condition for achieving the intent is satisfied or the intent is modified.

In a possible implementation, the first obtaining unit 10 is configured to obtain, from a third network element, the first network parameter value corresponding to the intent. The sending unit 13 is further configured to send an indication message to the third network element, where the indication message indicates the third network element to suspend execution of a command corresponding to the intent.

In a possible implementation, the first determining unit 11 includes: a second obtaining unit 111, configured to obtain an initial value of a network parameter corresponding to the intent; a timing unit 112, configured to start a timer if the initial value of the network parameter corresponding to the intent is less than or equal to a first threshold, where timing duration of the timer is a window length of a waiting time window of an intent to enter the sleep state; and a second determining unit 113, configured to: if the first network parameter value corresponding to the intent is still less than or equal to the first threshold when the timing duration expires, determine that the condition for achieving the intent is still not satisfied.

In a possible implementation, the network element further includes: a receiving unit 15, configured to receive a sleep time configuration request from a second network element, where the sleep time configuration request includes information about waiting time windows of all intents that are created by the second network element to enter the sleep state, and the information about the waiting time windows of all the intents to enter the sleep state includes window lengths. The sending unit 13 is further configured to send a sleep time configuration response to the second network element.

In a possible implementation, the receiving unit 15 is further configured to receive an intent creation request from the second network element, where the intent creation request includes information about a waiting time window of the intent that is created by the second network element to enter the sleep state, and the information about the waiting time window of the intent to enter the sleep state includes the window length. The sending unit 13 is further configured to send an intent creation response to the second network element.

In a possible implementation, the setting unit 14 is further configured to set a state of the intent to the sleep state.

In a possible implementation, the receiving unit 15 is configured to receive an intent modification request from the second network element, where the intent modification request requests to modify one or more parameters of the intent: the condition for achieving the intent, an intent command impact area, an intent priority, and an execution sequence of the intent. The network element further includes: a modification unit 17, configured to modify the one or more parameters of the intent based on the intent modification request. The setting unit is configured to set the sleep state to the active state.

In a possible implementation, the receiving unit 15 is further configured to receive an intent deactivation request from the second network element, where the deactivation request requests to deactivate the intent and retain context information of the intent. The network element further includes: a deactivation unit 18, configured to deactivate the intent based on the intent deactivation request. Alternatively, the receiving unit is further configured to receive an intent deletion request from the second network element, where the intent deletion request requests to delete the context information of the intent; and a deleting unit 19 is configured to delete the context information of the intent based on the intent deletion request.

In a possible implementation, the first obtaining unit 10 is further configured to obtain a second network parameter value corresponding to the intent. The network element further includes: a prediction unit 16, configured to predict, based on the second network parameter value, that the condition for achieving the intent can be satisfied in a first time period. The setting unit 14 is configured to set the sleep state to the active state. The sending unit 13 is configured to send a second notification message to the second network element, where the second notification message notifies the intent to enter the active state.

For specific implementation of the foregoing units, refer to descriptions of the first network element shown in FIG. 5 to FIG. 10C.

According to the intent state management network element provided in this embodiment of this application, the network parameter value corresponding to the intent is monitored, and execution of the intent is suspended when the condition for achieving the intent is not satisfied, so that network resources of the intent state management network element can be saved. In addition, when the condition for achieving the intent is satisfied or the intent is modified, the intent enters the active state, so that the state of the intent can be adjusted in time, thereby improving intent execution efficiency.

Figure 12:
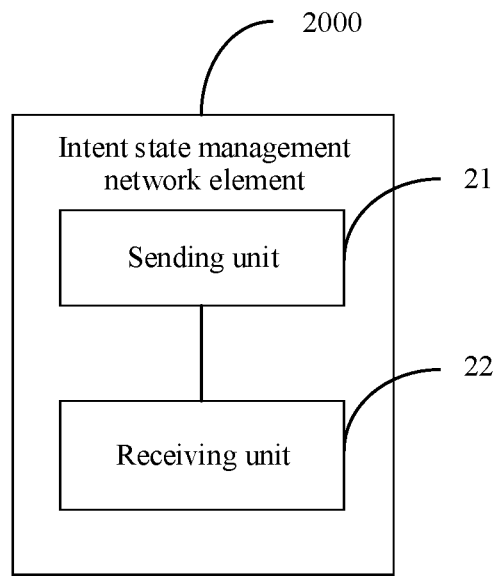
FIG. 12 is a schematic diagram of another modular structure of an intent state management network element according to an embodiment of this application.

Based on a same concept as the intent state management method, this application provides another intent state management network element. The intent state management network element may be the second network element 300 shown in FIG. 3. FIG. 12 is a schematic diagram of another modular structure of an intent state management network element according to an embodiment of this application. The intent state management network element 2000 includes:

a sending unit 21, configured to send an intent execution request to a first network element, where the intent execution request includes a network parameter corresponding to an intent and a condition for achieving the intent; and a receiving unit 22, configured to: when it is determined, based on a first network parameter value corresponding to the intent, that the condition for achieving the intent is not satisfied, receive a first notification message from the first network element, where the first notification message notifies the intent to enter a sleep state.

In a possible implementation, the sending unit 21 is further configured to send a sleep time configuration request to the first network element, where the sleep time configuration request includes information about waiting time windows of all intents that are created by the second network element to enter the sleep state, and the information about the waiting time windows of all the intents to enter the sleep state includes window lengths. The receiving unit 22 is further configured to receive a sleep time configuration response from the first network element.

In a possible implementation, the sending unit 21 is further configured to send an intent creation request to the first network element, where the intent creation request includes information about a waiting time window of the intent that is created by the second network element to enter the sleep state, and the information about the waiting time window of the intent to enter the sleep state includes the window length. The receiving unit 22 is further configured to receive an intent creation response from the first network element.

In a possible implementation, the sending unit 21 is further configured to send an intent modification request to the first network element, where the intent modification request requests to modify one or more of the following parameters of the intent: the condition for achieving the intent, an intent command impact area, an intent priority, and an execution sequence of the intent, and the modified intent is going to enter an active state.

In a possible implementation, the sending unit 21 is further configured to send an intent deactivation request to the first network element, where the deactivation request requests to deactivate the intent and retain context information of the intent, and a state of the intent is a deactive state; or the sending unit 21 is further configured to send an intent deletion request to the first network element, where the intent deletion request requests to delete context information of the intent, and the context information of the intent is to be deleted.

For specific implementation of the foregoing units, refer to descriptions of the second network element shown in FIG. 5 to FIG. 10C.

According to the intent state management network element provided in this embodiment of this application, when the condition for achieving the intent is not satisfied, the notification message may be received in time, to obtain a current state of the intent, thereby improving intent management efficiency.

Figure 13:
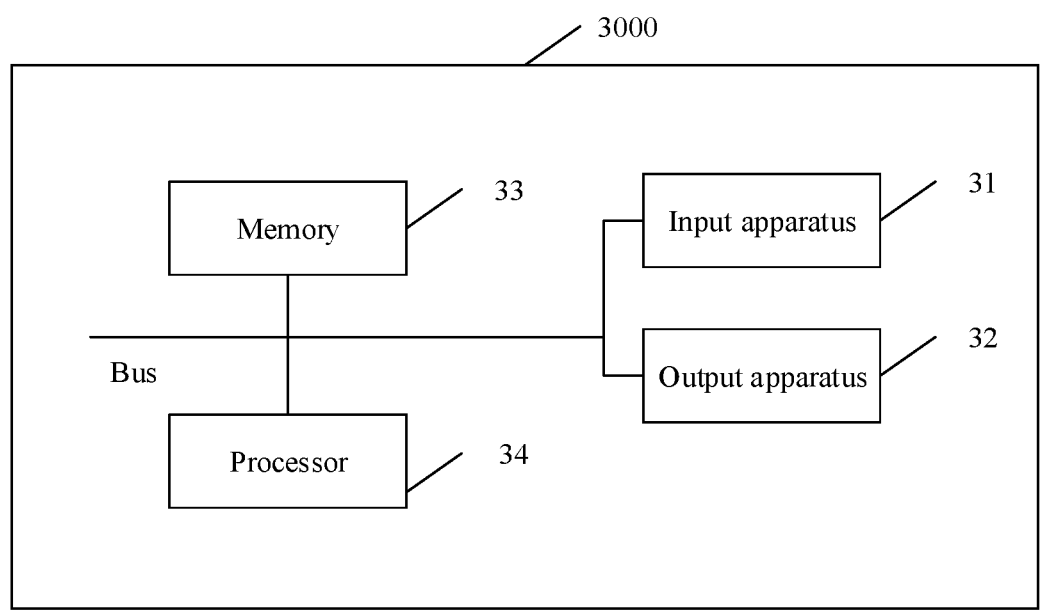
FIG. 13 is a schematic diagram of a structure of hardware of an intent state management network element according to an embodiment of this application.

FIG. 13 is a schematic diagram of a structure of hardware of an intent state management network element. The intent state management network element is configured to perform the intent state management method. Some or all of the foregoing methods may be implemented by using hardware, or may be implemented by using software or firmware.

Optionally, in a specific implementation, the intent state management network element may be a chip or an integrated circuit.

Optionally, when some or all of the intent state management methods in the foregoing embodiments are implemented using software or firmware, the intent state management methods may be implemented by using an intent state management network element 3000 provided in FIG. 13. As shown in FIG. 13, the intent state management network element 3000 may include:

a memory 33 and a processor 34 (there may be one or more processors 34 in the apparatus, and one processor is used as an example in FIG. 13), and may further include an input apparatus 31 and an output apparatus 32. In this embodiment, the input apparatus 31, the output apparatus 32, the memory 33, and the processor 34 may be connected through a bus or in another manner. That they are connected through a bus is used as an example in FIG. 13.

The processor 34 is configured to perform the method steps performed in FIG. 5 to FIG. 10C.

Optionally, a program of the intent state management method may be stored in the memory 33. The memory 33 may be a physically independent unit, or may be integrated with the processor 34. The memory 33 may alternatively be configured to store data.

Optionally, when some or all of the intent state management methods in the foregoing embodiments are implemented using software, the intent state management network element may alternatively include only a processor. The memory for storing a program is located outside the intent state management network element. The processor is connected to the memory by using a circuit or a wire, and is configured to read and execute the program stored in the memory.

The processor may be a central processing unit (CPU), a network processor (NP), or a WLAN device.

The processor may further include a hardware chip. The hardware chip may be an application-specific integrated circuit (ASIC), a programmable logic device (PLD), or a combination thereof. The PLD may be a complex programmable logic device (CPLD), a field-programmable logic gate array (FPGA), a generic array logic (GAL), or any combination thereof.

The memory may include a volatile memory, for example, a random-access memory (RAM). The memory may alternatively include a non-volatile memory, for example, a flash memory, a hard disk drive (HDD), or a solid-state drive (SSD). The memory may alternatively include a combination of the foregoing types of memories.

Persons skilled in the art should understand that one or more embodiments of this disclosure may be provided as a method, a system, or a computer program product. Therefore, the one or more embodiments of this disclosure may use a form of a hardware-only embodiment, a software-only embodiment, or an embodiment with a combination of software and hardware. Moreover, the one or more embodiments of this disclosure may use a form of a computer program product that is implemented on one or more computer-usable storage media (including but not limited to a disk memory, a CD-ROM, an optical memory, and the like) that include computer usable program code.

An embodiment of this application further provides a computer-readable storage medium that stores a computer program. When the program is executed by a processor, the steps of the intent state management methods described in any embodiment of this disclosure are implemented.

An embodiment of this application further provides a computer program product including instructions. When the computer program product runs on a computer, the computer is enabled to perform the steps of the intent state management method described in any embodiment of this disclosure.

It may be clearly understood by persons skilled in the art that, for the purpose of convenient and brief description, for a detailed working process of the foregoing system, apparatus, and unit, refer to a corresponding process in the foregoing method embodiments, and details are not described herein again.

In several embodiments provided in this application, it should be understood that the disclosed system, apparatus, and method may be implemented in another manner. For example, division into the units is merely logical function division and may be another division in actual implementation. For example, a plurality of units or components may be combined or integrated into another system, or some features may be ignored or not performed. The displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, in other words, may be located in one position, or may be distributed on a plurality of network units. Some or all of the units may be selected based on actual requirements to achieve the objectives of the solutions of embodiments.

All or some of the foregoing embodiments may be implemented using software, hardware, firmware, or any combination thereof. When software is used to implement the embodiments, all or some of the embodiments may be implemented in a form of a computer program product. The computer program product includes one or more computer instructions. When the one or more computer program instructions are loaded and executed on a computer, the procedures or functions according to embodiments of this application are all or partially generated. The computer may be a general-purpose computer, a dedicated computer, a computer network, or other programmable apparatuses. The one or more computer instructions may be stored in a computer-readable storage medium, or transmitted by using the computer-readable storage medium. The one or more computer instructions may be transmitted from a website, computer, server, or data center to another website, computer, server, or data center in a wired (e.g., a coaxial cable, an optical fiber, or a digital subscriber line (DSL)) or wireless (e.g., infrared, radio, or microwave) manner. The computer-readable storage medium may be any usable medium accessible by a computer, or a data storage device, such as a server or a data center, integrating one or more usable media. The usable medium may be a read-only memory (ROM), a random access memory (RAM), or a magnetic medium, for example, a floppy disk, a hard disk, a magnetic tape, a magnetic disk, or an optical medium, for example, a digital versatile disc (DVD), or a semiconductor medium, for example, a solid state drive (SSD).

What is claimed is:

1. An intent state management method, carried out by a first network element for driving operation of experiential networked intelligence (ENI) such that an intent is executed by the ENI in accordance with an intent state of the intent, comprising:
    obtaining a first network parameter value corresponding to an intent;
    determining based on the first network parameter value corresponding to the intent, that a condition for achieving the intent is not satisfied;
    suspending execution of the intent;
    sending a first notification message to a second network element, wherein the first notification message that notifies the intent to enter a sleep state; and
    setting the intent, which is in the sleep state, to an active state in accordance with:
        the condition for achieving the intent being satisfied, or
        the intent being modified.

2. The method according to claim 1, wherein the obtaining a first network parameter value corresponding to an intent comprises:
    obtaining, from a third network element, the first network parameter value corresponding to the intent; and
    wherein the method further comprises:

sending an indication message to the third network element that indicates to the third network element to suspend execution of a command corresponding to the intent.

3. The method according to claim 1, wherein the determining comprises:
obtaining an initial value of a network parameter corresponding to the intent;
starting, in accordance with the initial value of the network parameter corresponding to the intent being less than or equal to a first threshold, a timer, wherein a timing duration of the timer is a window length of a waiting time window of the intent to enter the sleep state; and
determining, in accordance with the first network parameter value corresponding to the intent still being less than or equal to the first threshold upon expiration of the timing duration, that the condition for achieving the intent is still not satisfied.

4. The method according to claim 3, wherein the method further comprises:
receiving a sleep time configuration request from the second network element, wherein the sleep time configuration request comprises information about waiting time windows of all intents that are created by the second network element to enter the sleep state, and wherein the information about the waiting time windows of all the intents to enter the sleep state comprises window lengths; and
sending a sleep time configuration response to the second network element.

5. The method according to claim 3, wherein the method further comprises:
receiving an intent creation request from the second network element, wherein the intent creation request comprises information about a waiting time window of the intent that is created by the second network element to enter the sleep state, and wherein the information about the waiting time window of the intent to enter the sleep state comprises the window length; and
sending an intent creation response to the second network element.

6. The method according to claim 1, wherein after the sending a first notification message to a second network element, the method further comprises:
setting a state of the intent to the sleep state.

7. The method according to claim 1, wherein the setting the intent that is in the sleep state to an active state in accordance with the intent is being modified comprises:
receiving an intent modification request from the second network element that requests to modify one or more parameters of the intent taken from the group consisting of:
the condition for achieving the intent,
an intent command impact area,
an intent priority, and
an execution sequence of the intent; and
modifying the one or more parameters of the intent based on the intent modification request; and
setting the sleep state to the active state.

8. The method according to claim 1, wherein the method further comprises at least one of the group consisting of:
deactivating the intent based on the intent deactivation request in accordance with receiving an intent deactivation request from the second network element that requests the first network element to deactivate the intent and retain context information of the intent; and
deleting the context information of the intent based on the intent deletion request in accordance with receiving an intent deletion request from the second network element that requests the first network element to delete context information of the intent.

9. The method according to claim 1, wherein the setting, the sleep state to an active state in accordance with the condition for achieving the intent is satisfied comprises:
obtaining a second network parameter value corresponding to the intent;
predicting, based on the second network parameter value, that the condition for achieving the intent can be satisfied in a first time period; and
setting the sleep state to the active state; and wherein the method further comprises:
sending a second notification message to the second network element that notifies the intent to enter the active state.

10. An intent state management method carried out by a second network element for driving operation of experiential networked intelligence (ENI), comprising:
sending an intent execution request to a first network element that comprises:
a network parameter corresponding to an intent, and
a condition for achieving the intent; and
receiving, in accordance with determining, based on a first network parameter value corresponding to the intent; that the condition for achieving the intent is not satisfied, a first notification message from the first network element that notifies the intent to enter a sleep state.

11. The method according to claim 10, wherein the method further comprises:
sending a sleep time configuration request to the first network element that comprises information about waiting time windows of all intents that are created by the second network element to enter the sleep state, and wherein the information about the waiting time windows of all the intents to enter the sleep state comprises window lengths; and
receiving a sleep time configuration response from the first network element.

12. The method according to claim 10, wherein the method further comprises:
sending an intent creation request to the first network element that comprises information about a waiting time window of the intent that is created by the second network element to enter the sleep state, and wherein the information about the waiting time window of the intent to enter the sleep state comprises a window length; and
receiving an intent creation response from the first network element.

13. The method according to claim 10, wherein the method further comprises:
sending an intent modification request to the first network element that requests the first network element to modify one or more parameters of the intent taken from the group consisting of:
the condition for achieving the intent,
an intent command impact area,
an intent priority,
an execution sequence of the intent, and
the intent to be modified is going to enter an active state.

14. The method according to claim 10, wherein the method further comprises at least one of the group consisting of:

sending an intent deactivation request to the first network element that requests: the first network element to deactivate the intent and retain context information of the intent, and a state of the intent to be a deactivate state; and sending an intent deletion request to the first network element that requests: the first network element to delete context information of the intent, and the context information of the intent to be deleted.

15. An intent state management network element, configured for driving operation of experiential networked intelligence (ENI) such that an intent is executed by the ENI in accordance with an intent state of the intent, comprising:

a processor, and a memory including instructions that, when executed by the processor, cause the apparatus to perform a method comprising:

obtaining a first network parameter value corresponding to an intent;

determining, based on the first network parameter value corresponding to the intent, that a condition for achieving the intent is not satisfied;

suspending execution of the intent;

sending a first notification message to a second network element that notifies the intent to enter a sleep state; and setting the intent, which is in the sleep state, to an active state in accordance with:
the condition for achieving the intent being satisfied, or
the intent being modified.

16. An intent state management network element, configured for driving operation of experiential networked intelligence (ENI) such that an intent is executed by the ENI in accordance with an intent state of the intent, comprising:

a processor, and a memory including instructions that, when executed by the processor, cause the apparatus to perform a method comprising:

sending an intent execution request to a first network element that comprises:
a network parameter corresponding to an intent, and
a condition for achieving the intent; and receiving, in accordance with determining, based on a first network parameter value corresponding to the intent, that the condition for achieving the intent is not satisfied, a first notification message from the first network element that notifies the intent to enter a sleep state.

17. An intent state management method, carried out by a first network element and a second network element for driving operation of experiential networked intelligence (ENI) such that an intent is executed by the ENI in accordance with an intent state of the intent, comprising:

obtaining, by the first network element, a first network parameter value corresponding to an intent;

determining, by the first network element based on the first network parameter value corresponding to the intent, that a condition for achieving the intent is not satisfied;

suspending, by the first network element, execution of the intent;

receiving, by the second network element, a first notification message from the first network element, wherein the first notification message notifies the intent to enter a sleep state; and setting, by the first network element, the sleep state to an active state when the condition for achieving the intent is satisfied or the intent is modified.

18. The intent state management network element according to claim 15, wherein the obtaining a first network parameter value corresponding to an intent comprises:

obtaining, from a third network element, the first network parameter value corresponding to the intent; and wherein the method further comprises:

sending an indication message to the third network element that indicates to the third network element to suspend execution of a command corresponding to the intent.

19. The intent state management network element according to claim 15, wherein the determining comprises:

obtaining an initial value of a network parameter corresponding to the intent;

starting, in accordance with the initial value of the network parameter corresponding to the intent being less than or equal to a first threshold, a timer, wherein a timing duration of the timer is a window length of a waiting time window of the intent to enter the sleep state; and determining, in accordance with the first network parameter value corresponding to the intent still being less than or equal to the first threshold upon expiration of the timing duration, that the condition for achieving the intent is still not satisfied.

20. The apparatus according to claim 19, wherein the method further comprises:

receiving a sleep time configuration request from the second network element, wherein the sleep time configuration request comprises information about waiting time windows of all intents that are created by the second network element to enter the sleep state, and wherein the information about the waiting time windows of all the intents to enter the sleep state comprises window lengths; and sending a sleep time configuration response to the second network element.

* * * * *

UNITED STATES PATENT AND TRADEMARK OFFICE
CERTIFICATE OF CORRECTION

| | | |
|---|---|---|
| PATENT NO. | : 12,317,193 B2 | Page 1 of 1 |
| APPLICATION NO. | : 17/898100 | |
| DATED | : May 27, 2025 | |
| INVENTOR(S) | : Li et al. | |

It is certified that error appears in the above-identified patent and that said Letters Patent is hereby corrected as shown below:

In the Claims

Claim 1: Column 32, Line 51: "determining based on the first network parameter value" should read as -- determining, based on the first network parameter value --.

Claim 1: Column 32, Line 56: "element, wherein the first notification message that" should read as -- element that --.

Claim 7: Column 33, Line 49: "accordance with the intent is being modified comprises:" should read as -- accordance with the intent being modified comprises: --.

Claim 10: Column 34, Line 26: "receiving, in accordance with determining, based on a first" should read as -- receiving, in accordance with determining based on a first --.

Claim 10: Column 34, Line 27: "network parameter value corresponding to the intent;" should read as -- network parameter value corresponding to the intent --.

Claim 16: Column 35, Line 42: "receiving, in accordance with determining, based on a first" should read as -- receiving, in accordance with determining based on a first --.

Claim 16: Column 35, Line 43: "network parameter value corresponding to the intent," should read as -- network parameter value corresponding to the intent --.

Signed and Sealed this
Twenty-first Day of October, 2025

John A. Squires
*Director of the United States Patent and Trademark Office*